US012668503B2

(12) United States Patent
Kuo et al.

(10) Patent No.: US 12,668,503 B2
(45) Date of Patent: Jun. 30, 2026

(54) INTERCALATED THIN FILMS AND METHODS FOR THEIR PREPARATION AND USE

(71) Applicant: University of Washington, Seattle, WA (US)

(72) Inventors: Ding-Yuan Kuo, Seattle, WA (US); Brandi M. Cossairt, Seattle, WA (US)

(73) Assignee: University of Washington, Seattle, WA (US)

( * ) Notice: Subject to any disclaimer, the term of this patent is extended or adjusted under 35 U.S.C. 154(b) by 19 days.

(21) Appl. No.: 18/681,477

(22) PCT Filed: Aug. 9, 2022

(86) PCT No.: PCT/US2022/039872
§ 371 (c)(1),
(2) Date: Feb. 5, 2024

(87) PCT Pub. No.: WO2023/018740
PCT Pub. Date: Feb. 16, 2023

(65) Prior Publication Data
US 2024/0367995 A1      Nov. 7, 2024

Related U.S. Application Data

(60) Provisional application No. 63/231,668, filed on Aug. 10, 2021.

(51) Int. Cl.
*C01G 39/06*       (2006.01)
*B01D 71/20*       (2006.01)
(Continued)

(52) U.S. Cl.
CPC ............. *C01G 39/06* (2013.01); *B01D 71/20* (2013.01); *C01G 41/00* (2013.01);
(Continued)

(58) Field of Classification Search
CPC .... C01G 41/00; H01M 4/133; C01P 2002/84; C01P 2002/72; B01D 71/20
See application file for complete search history.

(56) References Cited

U.S. PATENT DOCUMENTS

| | | | |
|---|---|---|---|
| 8,953,327 | B1 | 2/2015 | Salmon |
| 2005/0096400 | A1 | 5/2005 | Villwock |

(Continued)

FOREIGN PATENT DOCUMENTS

| | | |
|---|---|---|
| CN | 106750424 | 5/2017 |
| GB | 2483288 | 3/2012 |

(Continued)

OTHER PUBLICATIONS

Jimenez Sandoval, S.; Yang, D.; Frindt, R. F.; Irwin, J. C. Phys. Rev. B 1991, 44 (8), 3955-3962.

(Continued)

*Primary Examiner* — Anthony J Zimmer
*Assistant Examiner* — Annette Phan
(74) *Attorney, Agent, or Firm* — Christensen O'Connor Johnson Kindness PLLC

(57) ABSTRACT

Methods for making an intercalated layered film, intercalated layered films, and devices that include the intercalated layered films. In the method, in a first step, a suspension of a dispersed two-dimensional compound in a fluid is filtered through a filtration medium to provide a layered film of the two-dimensional compound on the filtration medium, and in a second step, filtering a solution of an intercalant in a solvent through the layered film of the two-dimensional compound on the filtration medium to provide the intercalated layered film.

13 Claims, 12 Drawing Sheets

(51) Int. Cl.

| | |
|---|---|
| *C01G 41/00* | (2006.01) |
| *H01M 4/133* | (2010.01) |
| *H01M 4/136* | (2010.01) |
| *H01M 4/58* | (2010.01) |
| *H01M 4/587* | (2010.01) |

(52) U.S. Cl.

CPC ...... *C01P 2002/08* (2013.01); *C01P 2002/72* (2013.01); *C01P 2002/82* (2013.01); *C01P 2002/84* (2013.01); *C01P 2004/03* (2013.01); *C01P 2006/40* (2013.01); *H01M 4/133* (2013.01); *H01M 4/136* (2013.01); *H01M 4/5815* (2013.01); *H01M 4/587* (2013.01)

(56) References Cited

U.S. PATENT DOCUMENTS

| | | |
|---|---|---|
| 2019/0039028 A1 | 2/2019 | Wanunu |
| 2019/0093640 A1 | 3/2019 | Chhowalla |

FOREIGN PATENT DOCUMENTS

| | | |
|---|---|---|
| JP | 2021102553 | 7/2021 |
| KR | 102175136 | 11/2020 |

OTHER PUBLICATIONS

Calandra, M. Phys. Rev. B—Condens. Matter Mater. Phys. 2013, 88 (24), 245428.

Knirsch, K. C.; Berner, N. C.; Nerl, H. C.; Cucinotta, C. S.; Gholamvand, Z.; McEvoy, N.; Wang, Z.; Abramovic, I.; Vecera, P.; Halik, M.; Sanvito, S.; Duesberg, G. S.; Nicolosi, V.; Hauke, F.; Hirsch, A.; Coleman, J. N.; Backes, C. ACS Nano 2015, 9 (6), 6018-6030.

Pierucci, D.; Zribi, J.; Livache, C.; Gréboval, C.; Silly, M. G.; Chaste, J.; Patriarche, G.; Montarnal, D.; Lhuillier, E.; Ouerghi, A.; Mahler, B. Appl. Phys. Lett. 2019, 115 (3), 032102.

Gamble, F. R.; DiSalvo, F. J.; Klemm, R. A.; Geballe, T. H. "Superconductivity in Layered Structure Organometallic Crystals" Science 1970, 168 (3931), 568-570.

Gamble, F. R.; Osiecki, J. H.; Cais, M.; Plsharody, R.; DiSalvo, F. J.; Geballe, T. H. "Intercalation Complexes of Lewis Bases and Layered Sulfides: A Large Class of New Superconductors," Science 1971, 174 (4008), 493-497.

Wan, C.; Gu, X.; Dang, F.; Itoh, T.; Wang, Y.; Sasaki, H.; Kondo, M.; Koga, K.; Yabuki, K.; Snyder, G. J.; Yang, R.; Koumoto, K. Nat. Mater. 2015, 14 (6), 622-627.

Zhang, Q.; Mei, L.; Cao, X.; Tang, Y.; Zeng, Z. "Intercalation and exfoliation chemistries of transition metal dichalcogenides" J. Mater. Chem. A 2020.

Jung, Y.; Zhou, Y.; Cha, J. J. Inorg. Chem. Front. 2016, 3 (4), 452-463.

Feng, N.; Meng, R.; Zu, L.; Feng, Y.; Peng, C.; Huang, J.; Liu, G.; Chen, B.; Yang, J. Nat. Commun. 2019 101 2019, 10 (1), 1-11.

Liang, Y.; Yoo, H. D.; Li, Y.; Shuai, J.; Calderon, H. A.; Robles Hernandez, F. C.; Grabow, L. C.; Yao, Y. Nano Lett. 2015, 15 (3), 2194-2202.

Ye, J. T.; Zhang, Y. J.; Akashi, R.; Bahramy, M. S.; Arita, R.; Iwasa, Y. Science 2012, 338 (6111), 1193-1196.

Kwak, I. H.; Abbas, H. G.; Kwon, I. S.; Park, Y. C.; Seo, J.; Cho, M. K.; Ahn, J. P.; Seo, H. W.; Park, J.; Kang, H. S. J. Mater. Chem. A 2019, 7 (14), 8101-8106.

Attanayake, N. H.; Thenuwara, A. C.; Patra, A.; Aulin, Y. V; Tran, T. M.; Chakraborty, H.; Borguet, E.; Klein, M. L.; Perdew, J. P.; Strongin, D. R. 2017.

Chhowalla, M.; Shin, H. S.; Eda, G.; Li, L. J.; Loh, K. P.; Zhang, H. Nature Chemistry. 2013, pp. 263-275.

Chianelli, R. R.; Scanlon, J. C.; Whittingham, M. S.; Gamble, F. R. Inorg. Chem. 1975, 14 (7), 1691-1696.

Gamble, F. R.; Osiecki, J. H.; DiSalvo, F. J. J. "Some Superconducting Intercalation Complexes of TaS2 and Substituted Pyridines," Chem. Phys. 1971, 55 (7), 3525-3530.

Zhu, G.; Liu, J.; Zheng, Q.; Zhang, R.; Li, D.; Banerjee, D.; Cahill, D. G. "Tuning thermal conductivity in molybdenum disulfide by electrochemical intercalation," Nat. Commun. 2016, 7 (1), 1-9.

Zheng, J.; Zhang, H.; Dong, S.; Liu, Y.; Tai Nai, C.; Suk Shin, H.; Young Jeong, H.; Liu, B.; Ping Loh, K. Nat. Commun. 2014, 5 (1), 1-7.

Wang, chen; He, Q.; Halim, U.; Liu, Y.; Zhu, E.; Lin, Z.; Xiao, H.; Duan, X.; Feng, Z.; Cheng, R.; Weiss, N. O.; Ye, G.; Huang, Y. C.; Wu, H.; Cheng, H. C.; Shakir, I.; Liao, L.; Chen, X.; Goddard, W. A.; Huang, Y.; Duan, X. Nature 2018, 555 (7695), 231-236.

Lin, Z.; Liu, Y.; Halim, U.; Ding, M.; Liu, Y.; Wang, Y.; Jia, C.; Chen, P.; Duan, X.; Wang, C.; Song, F.; Li, M.; Wan, C.; Huang, Y.; Duan, X. Nature. 2018, pp. 254-258.

Dungey, K. E.; Curtis, M. D.; Penner-Hahn, J. E. Chem. Mater. 1998, 10 (8), 2152-2161.

Lemmon, J. P.; Lerner, M. M. Chem. Mater. 1994, 6 (2), 207-210.

Saada, I.; Bissessur, R. J. Mater. Sci. 2012, 47 (15), 5861-5866.

Bissessur, R.; Heising, J.; Hirpo, W.; Kanatzidis, M. Chem. Mater. 1996, 8 (2), 318-320.

Divigalpitiya, W. M. R.; Frindt, R. F.; Morrison, S. R. Science 1989, 246 (4928), 369-371.

Tagaya, H.; Hashimoto, T.; Karasu, M.; Izumi, T.; Chiba, K. Chem. Lett. 1991, 20 (12), 2113-2116.

Kosidowski, L.; Powell, A. V. Chem. Commun. 1998, No. 20, 2201-2202.

Jeffery, A. A.; Nethravathi, C.; Rajamathi, M. "Scalable large nanosheets of transition metal disulphides through exfoliation of amine intercalated MS2 [M 1/4 Mo, W] in organic solvents," RSC Adv. 2015, 5 (63), 51176-51182.

Jeong, S.; Yoo, D.; Ahn, M.; Miro, P.; Heine, T.; Cheon, J. Nat. Commun. 2015, 6 (1), 1-7.

Klechikov, A.; Yu, J.; Thomas, D.; Sharifi, T.; Talyzin, A. V. Nanoscale 2015, 7 (37), 15374-15384.

Ries, L.; Petit, E.; Michel, T.; Diogo, C. C.; Gervais, C.; Salameh, C.; Bechelany, M.; Balme, S.; Miele, P.; Onofrio, N.; Voiry, D. Nat. Mater. 2019, 18 (10), 1112-1117.

Acerce, M.; Voiry, D.; Chhowalla, M. Nat. Nanotechnol. 2015, 10 (4), 313-318.

Janica, I.; Iglesias, D.; Ippolito, S.; Ciesielski, A.; Samorì, P. Chem. Commun. 2020, 56 (99), 15573-15576.

Dines, M. B. Science 1975, 188 (4194), 1210-1211.

Morrison, C.; Sun, H.; Yao, Y.; Loomis, R. A.; Buhro, W. E. Chem. Mater. 2020, 32 (5), 1760-1768.

Paul, A.; Borrelli, R.; Bouyanfif, H.; Gottis, S.; Sauvage, F. ACS Omega 2019, 4 (12), 14780-14789.

Gonzalez Rodriguez, P.; Yuan, H.; Van Den Nieuwenhuizen, K. J. H.; Lette, W.; Schipper, D. J.; Ten Elshof, J. E. ACS Appl. Mater. Interfaces 2016, 8 (42), 28926-28934.

Chen, N.; Ni, L.; Zhou, J.; Zhu, G.; Zhang, Y.; Chen, S.; Gao, F.; Lu, C.; Ji, H.; Chen, J.; Wang, X.; Guo, X.; Peng, L.; Ding, W.; Hou, W. Sustain. Energy Fuels 2018, 2 (12), 2788-2798.

Schollhorn, R.; Weiss, A. J. Less-Common Met. 1974, 36 (1-2), 229-236.

Schollhorn, R.; Sick, E.; Weiss, A. Zeitschrift für Naturforsch. B 1973, 28 (3-4), 168-171.

Kuo, D et al.—Direct Intercalation of MoS2 and WS2 Thin Films by Vacuum Filtration. Mater. Horiz., 2022, 9, 360. Published Sep. 15, 2021.

Jeffery, A. et al. Two-Dimensional Nanosheets and Layered Hybrids of MoS2 and WS2 through Exfoliation of Ammoniated MS2 (M = Mo, W). J. Phys. Chem. C 2014, 118, 2, 1386-1396. Dec. 23, 2013.

Li, X. et al.—Preparation of 2D MoSe2/PEDOT:PSS Composite and its Thermoelectric Properties. 2017Mater. Res. Express 4 116410. Published Nov. 28, 2017.

Santiago, Y. et al.—Surface Analysis and Electrochemistry of MoS2 Thin Films Prepared by Intercalation-Exfoliation Techniques. J. Electrochem. Soc. Vol. 141, No. 3, Mar. 1994.

Li, J. et al.—Large-Area, Flexible Broadband Photodetector Based on WS2 Nanosheets Films. Materials Science in Semiconductor Processing. Vol. 107, Mar. 1, 2020, 104804. Published Nov. 5, 2019.

(56)         References Cited

OTHER PUBLICATIONS

Piao, M. et al. Hydrothermal Synthesis of Stable Metallic 1T Phase WS2 Nanosheets for Thermoelectric Application. 2018 Nanotechnology 29 025705. Published Dec. 11, 2017.

M. Mattinen, M. Leskela and M. Ritala, Adv. Mater. Interfaces, 2021, 8, 2001677.

D. Saha and P. Kruse, J. Electrochem. Soc., 2020, 167, 126517.

Z. Zeng, Z. Yin, X. Huang, H. Li, Q. He, G. Lu, F. Boey and H. Zhang, Angew. Chemie, 2011, 123, 11289-11293.

M. Laipan, L. Xiang, J. Yu, B. R. Martin, R. Zhu, J. Zhu, H. He, A. Clearfield and L. Sun, Prog. Mater. Sci., 2020, 109, 100631.

N. Wakabayashi, H. G. Smith and R. M. Nicklow, Phys. Rev. B, 1975, 12, 659-663.

W. J. Schutte, J. L. De Boer and F. Jellinek, J. Solid State Chem., 1987, 70, 207-209.

F. Hof, R. A. Schäfer, C. Weiss, F. Hauke and A. Hirsch, Chem.—A Eur. J., 2014, 20, 16644-16651.

X. S. Chu, A. Yousaf, D. O. Li, A. A. Tang, A. Debnath, D. Ma, A. A. Green, E. J. G. Santos and Q. H. Wang, Chem. Mater., 2018, 30, 2112-2128.

J. B. Goodenough and K. S. Park, J. Am. Chem. Soc., 2013, 135, 1167-1176.

E. Pomerantseva and Y. Gogotsi, Nat. Energy, 2017, 2, 17089.

L. Peng, Y. Zhu, D. Chen, R. S. Ruoff and G. Yu, Adv. Energy Mater., 2016, 6, 1600025.

J. Xu, J. Zhang, W. Zhang and C. S. Lee, Adv. Energy Mater., 2017, 7, 1700571.

M. Rajapakse, B. Karki, U. O. Abu, S. Pishgar, M. R. K. Musa, S. M. S. Riyadh, M. Yu, G. Sumanasekera and J. B. Jasinski, npj 2D Mater. Appl., 2021, 5, 1-21.

H. D. Yoo, Y. Liang, H. Dong, J. Lin, H. Wang, Y. Liu, L. Ma, T. Wu, Y. Li, Q. Ru, Y. Jing, Q. An, W. Zhou, J. Guo, J. Lu, S. T. Pantelides, X. Qian and Y. Yao, Nat. Commun., 2017, 8, 1-10.

Y. Xu, F. Bahmani, M. Zhou, Y. Li, C. Zhang, F. Liang, S. H. Kazemi, U. Kaiser, G. Meng and Y. Lei, "Enhancing potassium-ion battery performance by defect and interlayer engineering," Nanoscale Horizons, 2018, 4, 202-207.

K. Liang, R. A. Matsumoto, W. Zhao, N. C. Osti, I. Popov, B. P. Thapaliya, S. Fleischmann, S. Misra, K. Prenger, M. Tyagi, E. Mamontov, V. Augustyn, R. R. Unocic, A. P. Sokolov, S. Dai, P. T. Cummings and M. Naguib, "Engineering the Interlayer Spacing by Pre-Intercalation for High Performance Supercapacitor MXene Electrodes in Room Temperature Ionic Liquid," Adv. Funct. Mater., 2021, 31, 2104007.

H. Dai, M. Tang, J. Huang and Z. Wang, ACS Appl. Mater. Interfaces, 2021, 13, 10870-10877.

S. Fleischmann, M. A. Spencer and V. Augustyn, Chem. Mater., 2020, 32, 3325-3334.

J. Zhou, Z. Lin, H. Ren, X. Duan, I. Shakir, Y. Huang and X. Duan, Adv. Mater., 2021, 33, 2004557.

Q. Cao, F. Grote, M. Humann and S. Eigler, Nanoscale Adv., 2021, 3, 963-982.

Y. Zhu, Y. Qian, Z. Ju, L. Peng and G. Yu, "Solvent-Dependent Intercalation and Molecular Configurations in Metallocene-Layered Crystal Superlattices," Nano Lett., 2018, 18, 6071-6075.

M. K. E. B. Santiago, C. Declet-Flores, A. Diaz, M. M. Vêlez, M. Z. Bosques, Y. Sanakis and J. L. Colón, Langmuir, 2007, 23, 7810-7817.

C. M. Cardona and A. E. Kaifer, J. Am. Chem. Soc., 1998, 120, 4023-4024.

N. Shpigel, M. D. Levi, S. Sigalov, T. S. Mathis, Y. Gogotsi and D. Aurbach, J. Am. Chem. Soc., 2018, 140, 8910- 8917.

S. Boyd, K. Ganeshan, W. Y. Tsai, T. Wu, S. Saeed, D. en Jiang, N. Balke, A. C. T. van Duin and V. Augustyn, Nat. Mater., 2021, 20, 1689-1694.

E. Cha, D. K. Kim and W. Choi, Front. Energy Res., 2021, 9, 44.

T. Stephenson, Z. Li, B. Olsen and D. Mitlin, Energy Environ. Sci., 2013, 7, 209-231.

D. Voiry, H. Yamaguchi, J. Li, R. Silva, D. C. B. Alves, T. Fujita, M. Chen, T. Asefa, V. B. Shenoy, G. Eda and M. Chhowalla, Nat. Mater., 2013, 12, 850-855.

D. Astruc, Eur. J. Inorg. Chem., 2017, 2017, 6-29.

S. Mohsen Beladi-Mousavi, S. Sadaf, A.-K. Hennecke, J. Klein, A. Mado Mahmood, C. Rüttiger, M. Gallei, F. Fu, E. Fouquet, J. Ruiz, D. Astruc, L. Walder, S. M. Beladi-Mousavi, S. Sadaf, A. Hennecke, J. Klein, A. M. Mahmood, L. Walder, C. Rüttiger, M. Gallei, F. Fu, E. Fouquet, J. Ruiz and D. Astruc, Angew. Chemie Int. Ed., 2021, 60, 13554-13558.

B. Hwang, M. S. Park and K. Kim, ChemSusChem, 2015, 8, 310-314.

G. Eda, H. Yamaguchi, D. Voiry, T. Fujita, M. Chen and M. Chhowalla, Nano Lett., 2011, 11, 5111-5116.

S. J. R. Tan, I. Abdelwahab, Z. Ding, X. Zhao, T. Yang, G. Z. J. Loke, H. Lin, I. Verzhbitskiy, S. M. Poh, H. Xu, C. T. Nai, W. Zhou, G. Eda, B. Jia and K. P. Loh, J. Am. Chem. Soc., 2017, 139, 2504-2511.

J. Zhang, A. R. Harris, R. W. Cattrall and A. M. Bond, Anal. Chem., 2010, 82, 1624-1633.

M. Cuartero, L. Chai, B. Zhang, R. De Marco and G. A. Crespo, Electrochim. Acta, 2019, 315, 84-93.

C. Mao, D. Yuan, L. Wang and E. Bakker, J. Electroanal. Chem., 2021, 880, 114800.

B. Kang, H. Tang, Z. Zhao and S. Song, ACS Omega, 2020, 5, 6229-6239.

International Preliminary Report on Patentability mailed on Feb. 13, 2024, issued in the corresponding International Application No. PCT/US2022/039872, filed on Aug. 9, 2022; 9 pages.

International Search Report mailed on Jan. 4, 2023, issued in the corresponding International Application No. PCT/US2022/039872, filed on Aug. 9, 2022; 4 pages.

Written Opinion of the International Searching Authority mailed on Jan. 4, 2023, issued in the corresponding International Application No. PCT/US2022/039872, filed on Aug. 9, 2022; 8 pages.

Tagaya, H. et al., "Inclusion of Substituted Ferrocenes and Aromatic Compounds into M0S2. The Chemical Society of Japan. Layers as New Intercalation Compounds," Chemistry Letters, pp.

1 μm

100

110 120  130  140 150

INTERCALATED THIN FILMS AND METHODS FOR THEIR PREPARATION AND USE

CROSS-REFERENCE TO RELATED APPLICATION

This application is a National Stage of International Application No. PCT/US2022/039872 filed Aug. 9, 2023, which claims the benefit of U.S. Patent Application No. 63/231,668, filed Aug. 10, 2021, the disclosure of each of which is expressly incorporated herein by reference in its entirety.

BACKGROUND

In the development of next-generation electronics and energy devices, intercalation compounds of transition metal dichalcogenides (TMDCs) are gaining attention for their unique properties that result from synergistic interactions between guest species and host materials. Nowadays, intercalation compounds of $MoS_2$ and $WS_2$ are commonly prepared by a two-step process: (1) exfoliation to form single-layer and/or few-layer nanosheets and (2) restacking the nanosheets with the guest species by vigorously mixing the exfoliated suspension with the solution of guest species. While a wide variety of intercalation compounds have been synthesized using this approach, the intercalation process is often time-consuming, and the product slurry limits their quality, impeding characterization and application.

Intercalation compounds of transition metal dichalcogenides (TMDCs) offer a wide variety of physicochemical properties through the combination of guest species and intrinsic traits of the host TMDCs. The building blocks of TMDCs are layers represented as $TX_2$ where T is the transition metal atom and X is chalcogen atom. These layers are loosely bound to each other via van der Waals interactions. This unique layered structure enables intercalation with a great variety of guest species into the van der Waals gap between these layers. Among all the TMDCs, intercalation compounds of group VI TMDCs (e.g., $MoS_2$ and $WS_2$) have attracted attention because of their great potential in applications of energy storage, electronics, and catalysis. The expansion of the interlayer distance due to intercalation has been applied to reduce the energy barrier for alkali ion batteries. Superconductivity of intercalated $MoS_2$ has been demonstrated. Moreover, intercalation compounds of $MoS_2$ and $WS_2$ have shown enhanced activity for the hydrogen evolution reaction by modifying the electronic structure of the catalysts.

Group VI TMDCs are, however, one of the most challenging host materials among the TMDCs for intercalation. Intercalation generally involves a charge transfer process from the guest species (electron donors) to the layered hosts (electron acceptors). Because of their low electron affinity, $MoS_2$ and $WS_2$ are much weaker electron acceptors. Only strong electron donors (e.g., n-butyllithium) can be intercalated into $MoS_2$ and $WS_2$ directly; in contrast, much weaker electron donors can be intercalated into group IV and V TMDCs. For example, direct intercalation of ammonia into $TiS_2$ and intercalation of pyridine into $TaS_2$ are facile.

To expand the variety of guest species in group VI TMDCs, several strategies have been explored. Electrochemical intercalation has enabled a great variety of intercalation compounds of $MoS_2$ with positively charged intercalants from small alkali cations to alkylammonium cations. Instead of accepting electrons from electron donors, this approach injects electrons into the conduction band of $MoS_2$ by applying a reducing potential. The Coulomb interaction between the negatively charged $MoS_2$ layers and the cations further drives the intercalation process. The disadvantage of this approach is the limitation of guest species to cations. Alternatively, restacking the exfoliated $MoS_2$ and $WS_2$ layers in a solution with guest species is another method to prepare intercalation compounds of $MoS_2$ and $WS_2$. Guest species such as cations, polymers, and clusters have been successfully intercalated into $MoS_2$ and $WS_2$ using this method. This strategy has also been applied to intercalating organometallic compounds (e.g., metallocenes) and organic molecules that are not electron donors (e.g., naphthalene) into $MoS_2$. The intercalation occurs after vigorously mixing an aqueous suspension of single layer $MoS_2$ and (usually) an immiscible organic solvent that contains the guest species.

While there are many different categories of guest species that have been intercalated into $MoS_2$ and $WS_2$, the experimental procedure needs to be designed separately in each case and some of syntheses require several days. Moreover, the products are often generated in the form of a slurry, which may limit the processability and quality of the intercalated materials. For example, sonication is commonly required to form a suspension for deposition of a high-quality film for electrochemical characterization. However, these intercalation compounds may de-intercalate during sonication, which complicates the characterization of the intercalation compounds.

Despite the advances in the development of methods for intercalating guest species into host materials, a need exists for improved methods that facilitate the intercalation of guest species into host materials. The present disclosure seeks to fulfill this need and provides further related advantages.

SUMMARY

In one aspect, the present disclosure provides a method of making an intercalated layered film. In certain embodiments, the method comprises filtering a suspension of a dispersed two-dimensional compound in a fluid through a filtration medium to provide a layered film of the two-dimensional compound on the filtration medium; and filtering a solution of an intercalant in a solvent through the layered film of the two-dimensional compound on the filtration medium to provide the intercalated layered film.

In another aspect, the present disclosure provides an intercalated layered film. In certain embodiments, the intercalated layered film comprises a layered film of a two-dimensional compound comprising two or more layers of the two-dimensional compound, and an intercalant disposed between the two or more layers of the two-dimensional compound. In certain of these embodiments, the intercalant is an electron-proton transfer mediator.

In a further aspect, the present disclosure provides devices that include the intercalated layered film.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

Figure 1A:
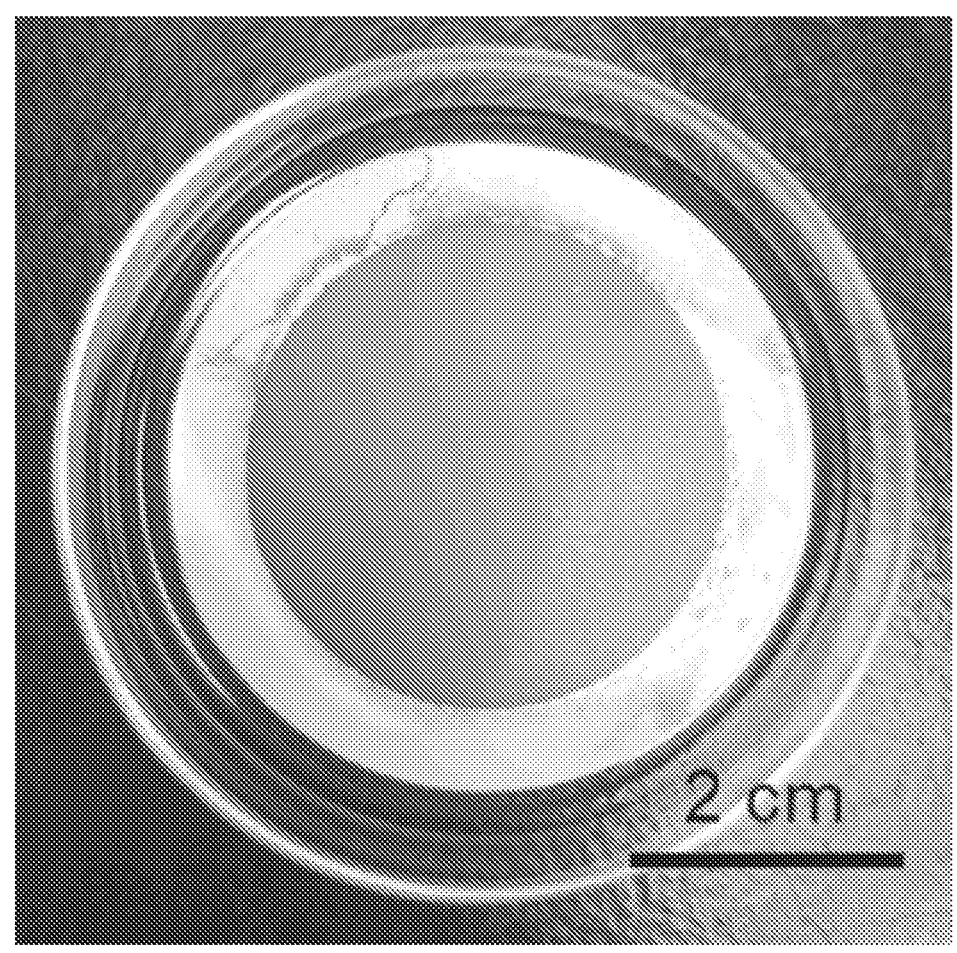
FIG. 1A is an optical image of a representative restacked $MoS_2$ film on a nitrocellulose membrane.

The present disclosure provides methods for making an intercalated layered film, intercalated layered films, and devices that include the intercalated layered films.

In one aspect, the present disclosure provides a versatile method for intercalating different categories of guest species into restacked thin films of two-dimensional materials (e.g., $MoS_2$ and $WS_2$ thin films). Solvents have been shown to intercalate into restacked graphene oxide membranes. Similarly, the functionalization of the $MoS_2$ has been achieved in the form of restacked $MoS_2$ via vacuum filtration indicating that small molecules can diffuse into the space in between the sheets of layered materials. As described herein, the present disclosure provides filtration (e.g., vacuum) to accelerate the diffusion of guest species and encapsulate them in the van der Waals gap of layered materials. The present disclosure describes thin films formed with three different categories of guest species including organometallic compounds, n-alkylamines, and electron-proton transfer mediators in both $MoS_2$ and $WS_2$. The approach enables the facile synthesis of a great variety of intercalation compounds of $MoS_2$ and $WS_2$ in a thin-film morphology, which opens new doors to developing electrocatalysts and energy storage materials. In particular, the method allows the easy intercalation of electron-donating (e.g., nucleophilic, which, as used herein, refers to a molecule having electron density donating characteristics) and non-electron donating molecules.

In one aspect, the present disclosure provides a method of making an intercalated layered film. In certain embodiments, the method comprises filtering a suspension of a dispersed two-dimensional compound in a fluid through a filtration medium to provide a layered film of the two-dimensional compound on the filtration medium; and filtering a solution of intercalant in a solvent through the layered film of the two-dimensional compound on the filtration medium to provide the intercalated layered film.

The intercalated layered film produced by the method described herein is a thin film. As used herein, the term "thin film" refers to a layered material having a thickness from less than a nanometer (monolayer) to several micrometers in thickness. The term "thin film" refers to a film that comprises of one or more layers of two-dimensional materials and having a thickness from about 1 Angstrom (e.g., atomically thin films like monolayer graphene) to 10 micrometers (e.g., a multilayered thin film). In the method described herein, a layered thin film that includes only two-dimensional materials is made in the first step. A layered thin film can be characterized by scanning electron microscopy (SEM) and X-ray diffraction (XRD). Thin films include those labeled as restacked $MoS_2$ and $WS_2$ in the figures showing XRD and SEM data.

In certain embodiments, the thickness of the intercalated layered film described herein is from about 0.9 to about 2.1 μm. The thickness of the film can be controlled by the volume of the suspension of exfoliated two-dimensional material added during the filtration process.

As used herein, the term "two-dimensional compound" or "single-layer material" refers to crystalline solids having a single layer of atoms, or a-few-atoms-thick (e.g., 2 to 10 atoms) layers of atoms. The two-dimensional compound is the host material for the intercalant.

As used herein, the term "intercalant" or "guest species" refers to a compound, an ion, or an atom that is or will be inserted, disposed, or positioned between or among existing elements or layers. In the method described herein, the intercalant is soluble (i.e., is dissolved) in a solvent to provide the solution that is filtered through the layered film of the two-dimensional compound.

In certain embodiments, the intercalant is present in the intercalated layered film in an amount of 3 mole % or more (e.g., 5 mole % or more, 10 mole % or more, 20 mole % or more, 30 mole % or more, or 40 mole % or more), relative to the two-dimensional compound.

In certain embodiments, the intercalant is present in the intercalated layered film in an amount of 50 mole % or less (e.g., 40 mole % or less, 30 mole % or less, 20 mole % or less, or 10 mole % or less).

In certain embodiments of the intercalated layered film, the intercalated compound has decreased chemical reactivity (e.g., oxygen reactivity, water reactivity) compared to a corresponding non-intercalated compound.

The method described herein is useful for intercalating nucleophiles and non-nucleophiles into host materials. There are existing methods that can be used to intercalate non-nucleophiles, such as ferrocene, into thin films (Divigalpitiya et al. *Science* 1989, 246, 369-371). The method described herein advantageously intercalates nucleophiles and non-nucleophiles into thin films. In certain embodiments, the intercalant is a nucleophile or a non-nucleophile. As used herein, the term "non-nucleophilic" refers to a property of a molecule or a compound that does not have the tendency to donate electrons or react with electron-poor or deficient sites. As used herein, the term "nucleophilic" refers to a property of a molecule or a compound to donate electrons or electron density, and/or to react with electron-poor or deficient sites.

In certain embodiments, the intercalant comprises an organometallic compound (e.g., metallocene), a cationic compound, a nucleophilic organic compound (e.g., an amine), a non-nucleophilic organic compound, a molecular cluster compound, a nanoparticle, or any combination thereof. As used herein, the term "cationic" refers to a moiety that is positively charged, or ionizable to a positively charged moiety under physiological conditions. Examples of cationic moieties include, for example, amino, ammonium, pyridinium, imino, sulfonium, and quaternary phosphonium groups. As used herein, the term "organometallic compound" refers to chemical compounds containing at least one chemical bond between a carbon atom of an organic molecule and a metal, including alkaline, alkaline earth, and transition metals, and sometimes broadened to include metalloids like boron, silicon, and selenium, as well. Aside from bonds to organyl fragments or molecules, bonds to 'inorganic' carbon, like carbon monoxide (metal carbonyls), cyanide, or carbide, are generally considered to be organometallic as well. Some related compounds such as transition metal hydrides and metal phosphine complexes are often included in discussions of organometallic compounds, though strictly speaking, they are not necessarily organometallic.

In certain embodiments of the method, the dispersed two-dimensional compound comprises a transition metal dichalcogenide, graphene or related group XIV 2D materials, boron nitride, a MXene (e.g., transition metal carbides, transition metal nitrides, transition metal carbonitrides), graphene oxide, phosphorene or related group XV 2D materials, a MBene (e.g., two-dimensional transition metal borides), or any combination thereof. In certain of these embodiments, the dispersed two-dimensional compound comprises a transition metal dichalcogenide. Suitable transition metal dichalcogenides have formula $ME_2$, wherein M comprises an element of group IV, V, or VI (e.g., Ti, Zr, V, Nb, Mo, W, and any combination thereof), and E comprises S, Se, or Te, and any combination thereof. In certain embodiments, the two-dimensional compound is $MoS_2$. In other embodiments, the two-dimensional compound is $WS_2$.

In certain embodiments, the suspension of the dispersed two-dimensional compound comprises a two-dimensional compound prepared by exfoliation. In certain embodiments of the method, the layered film of the two-dimensional compound on the filtration medium comprises a monolayer of the two-dimensional compound. As used herein, the term "monolayer" is defined as a layer of a two-dimensional compound that is one molecule in thickness. Atomic force microscopy (AFM) and tunneling electron microscopy (TEM) can be used to determine if a monolayer of the two-dimensional compound is present. In other embodiments of the method, the layered film of the two-dimensional compound on the filtration medium comprises a multilayer of the two-dimensional compound.

In certain embodiments, the filtration medium is a filtration membrane. Suitable filtration membranes include nitrocellulose membranes, cellulose acetate membranes, cellulose nitrate membranes, polyamide (nylon) membranes, polycarbonate membranes, polypropylene membranes, polyether sulfone membranes, polyvinyl chloride membranes, polyvinylidene fluoride membranes, and polytetrafluoroethylene membranes. In the methods, the filtration medium is chemically unreactive relative to the suspension of dispersed two-dimensional compound in the fluid, the solution of intercalant, the layered film of the two-dimensional compound, and/or the intercalated layered film.

In certain embodiments, the layered film of the two-dimensional compound on the filtration medium comprises an amount of the fluid (i.e., is wet, is not free of the fluid) before filtering the solution of intercalant through the layered film.

In certain embodiments, each filtering step independently comprises filtering with an active vacuum, with a static vacuum, with gravity, or a combination thereof (e.g., in a filtering sequence comprising an active vacuum, a static vacuum, and/or with gravity).

In certain embodiments, the intercalated layered film comprises an X-ray diffraction pattern comprising peaks (e.g., in some embodiments, peaks having a signal to noise ratio of greater than 10) corresponding to a layered structure oriented along a single plane. Intercalated films prepared by the method described herein having XRDPs that differ from patterns of films that do not include intercalant.

In another aspect, the present disclosure provides an intercalated layered film. In certain embodiments, the intercalated layered film comprises a layered film of a two-dimensional compound comprising two or more layers of the two-dimensional compound, and an intercalant disposed between the two or more layers of the two-dimensional compound. In certain of these embodiments, the intercalated layered film comprises a layered film of a two-dimensional compound comprising two or more layers of the two-dimensional compound, and an intercalant comprising an electron-proton transfer mediator between the two or more layers of the two-dimensional compound.

In certain embodiments, the intercalated layered film is a quinone-intercalated $MoS_2$, a quinone-intercalated $WS_2$, a phenazine-intercalated $MoS_2$, or a phenazine-intercalated $WS_2$.

In certain embodiments, the intercalant is present in the intercalated layered film in an amount of 3 mole % or more (e.g., 5 mole % or more, 10 mole % or more, 20 mole % or more, 30 mole % or more, or 40 mole % or more), relative to the two-dimensional compound.

In certain embodiments, the intercalant is present in the intercalated layered film in an amount of 50 mole % or less (e.g., 40 mole % or less, 30 mole % or less, 20 mole % or less, or 10 mole % or less).

In certain embodiments of the intercalated layered film, the intercalated compound has decreased chemical reactivity (e.g., oxygen reactivity, water reactivity) compared to a corresponding non-intercalated compound.

In certain embodiments of the intercalated layered film, the dispersed two-dimensional compound comprises a transition metal dichalcogenide, graphene or related group XIV 2D materials, boron nitride, a MXene (e.g., transition metal carbides, transition metal nitrides, transition metal carbonitrides), graphene oxide, phosphorenene or related group XV 2D materials, a MBene (e.g., two-dimensional transition metal borides), or any combination thereof. In certain of these embodiments, the dispersed two-dimensional compound comprises a transition metal dichalcogenide. Suitable transition metal dichalcogenides have formula $ME_2$, wherein M comprises an element of group IV, V, or VI (e.g., Ti, Zr, V, Nb, Mo, W, and any combination thereof), and E comprises S, Se, or Te, and any combination thereof. In certain embodiments, the two-dimensional compound is $MoS_2$. In other embodiments, the two-dimensional compound is $WS_2$.

In certain embodiments, the intercalated layered film comprises an X-ray diffraction pattern comprising peaks (e.g., in some embodiments, peaks having a signal to noise ratio of greater than 10) corresponding to a layered structure oriented along a single plane.

In certain embodiments, the intercalated layered film is not in the form of a slurry.

In certain embodiments, the intercalated layered film is free-standing. As used herein, the term "free-standing"

refers to a structure that can stand alone or free of support or attachment. A free-standing film is a film that can maintain its shape without a backing or a support structure.

In certain embodiments, the present disclosure provides an intercalated layered film prepared according to the methods described herein.

In certain embodiments, the intercalated layered film described herein includes one or more functional intercalants that impart advantageous function to the film. Representative functional intercalants include amines for carbon dioxide sensing, organometallics as catalysts for chemical reactions such as hydrogen evolution, oxygen reduction, and carbon dioxide reduction. The film comprising an electron-proton transfer mediator as the intercalant can be used for energy storage.

In a further aspect, the present disclosure provides devices that include the intercalated layered film.

In certain embodiments, the device includes an intercalated layered film as described herein. In certain embodiments, the device is an electrolyzer, a fuel cell, an electrode, or a sensor.

Figure 10:
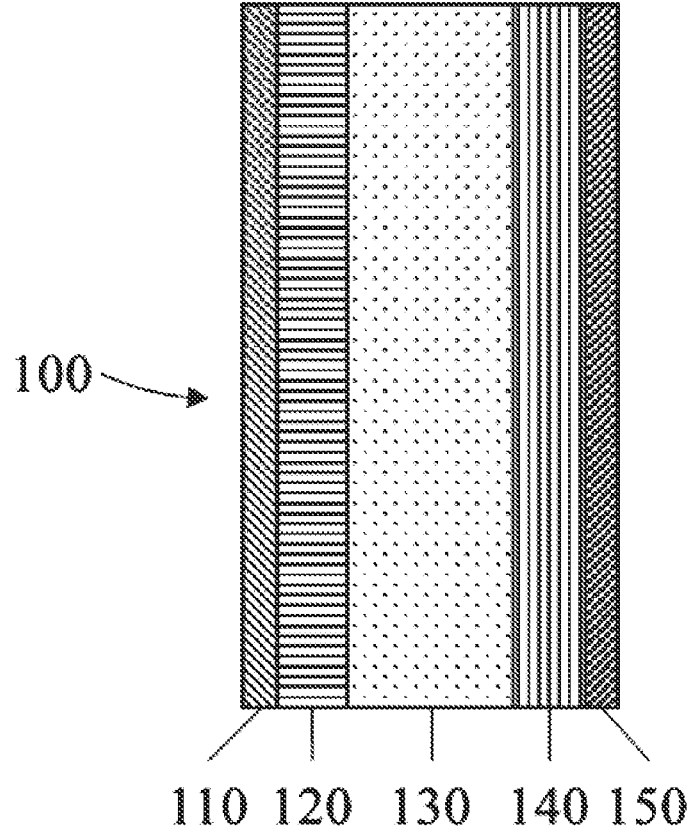
FIG. 10 is a schematic illustration of an energy storage device (e.g., battery) that includes a cathode and/or anode that includes a representative thin film as described herein.

In certain embodiments, the device is an energy storage device. In one such embodiment, the device is a battery. FIG. 10 shows a cross-sectional view of a typical battery having an intercalated layered thin film obtained by the method in this disclosure. Referring to FIG. 10, battery 100 is provided having first current collector 110, anode layer 120, electrolyte layer 130, cathode layer 140, and second current collector 150. The intercalated film can be used as either a cathode layer, an anode layer, or both cathode and anode layers.

The selection of intercalant in either the anode or cathode layer depends on the redox potential of the intercalant. The redox potential of intercalant in the anode layer needs to be more negative than the redox potential of intercalant in the cathode layer. Representative anode/cathode pairs include anode (decamethylferrocene)/cathode (ferrocene) and anode (phenazine)/cathode (benzoquinone). The two-dimensional compounds as the host material for these intercalants can be any of those described herein. For the battery depicted in FIG. 10, the two-dimensional compounds may the same or different for each of the anode and cathode layer.

The following is a description of the preparation and characterization of representative intercalated layered thin films.

Figure 1B:
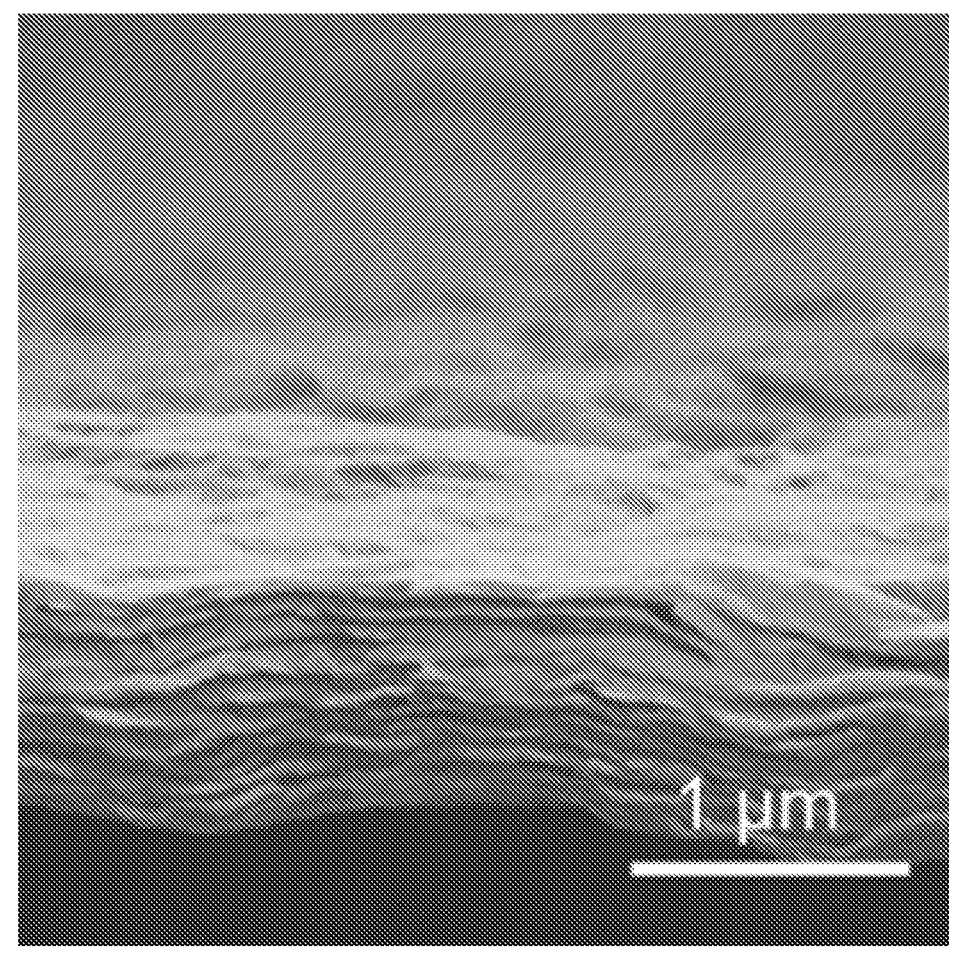
FIG. 1B is a scanning electron microscopic cross-sectional image of a representative restacked $MoS_2$ film.
Figure 1C:
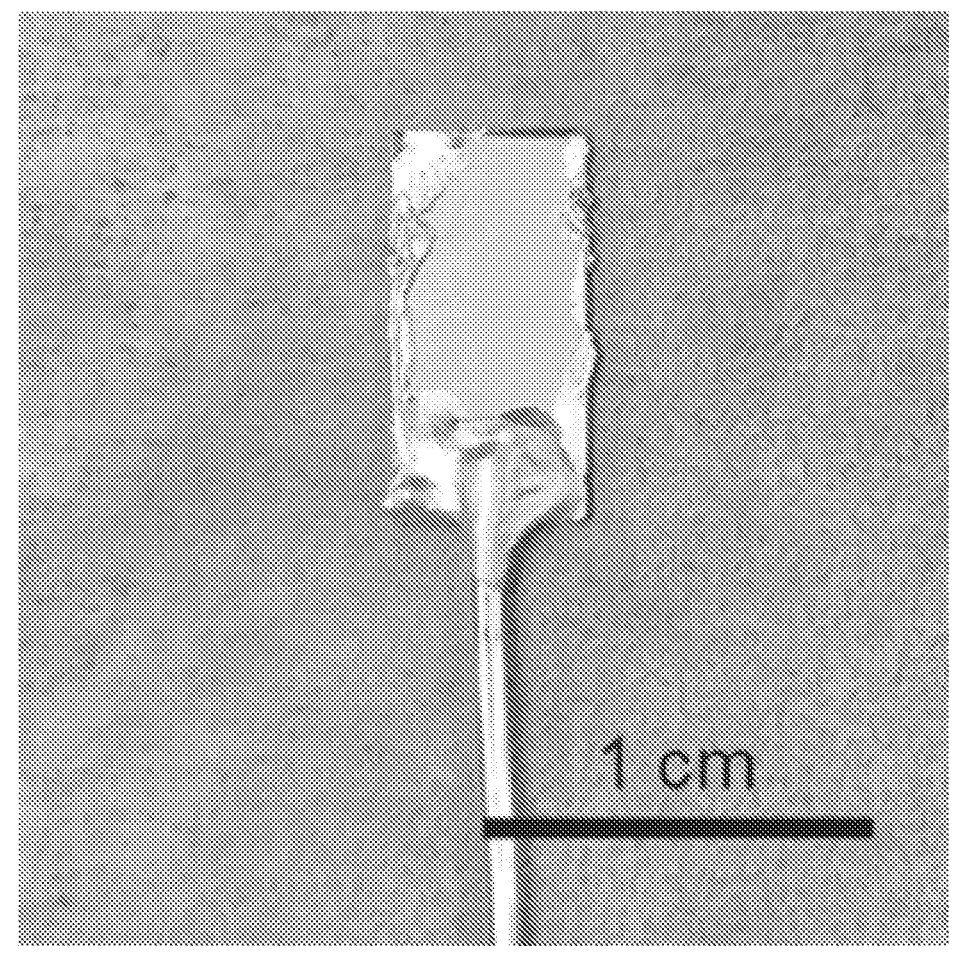
FIG. 1C is an optical image of an electrode prepared by transferring a restacked $MoS_2$ film onto a gold substrate. The edges of the electrode were sealed using silver paint.
Figure 5:
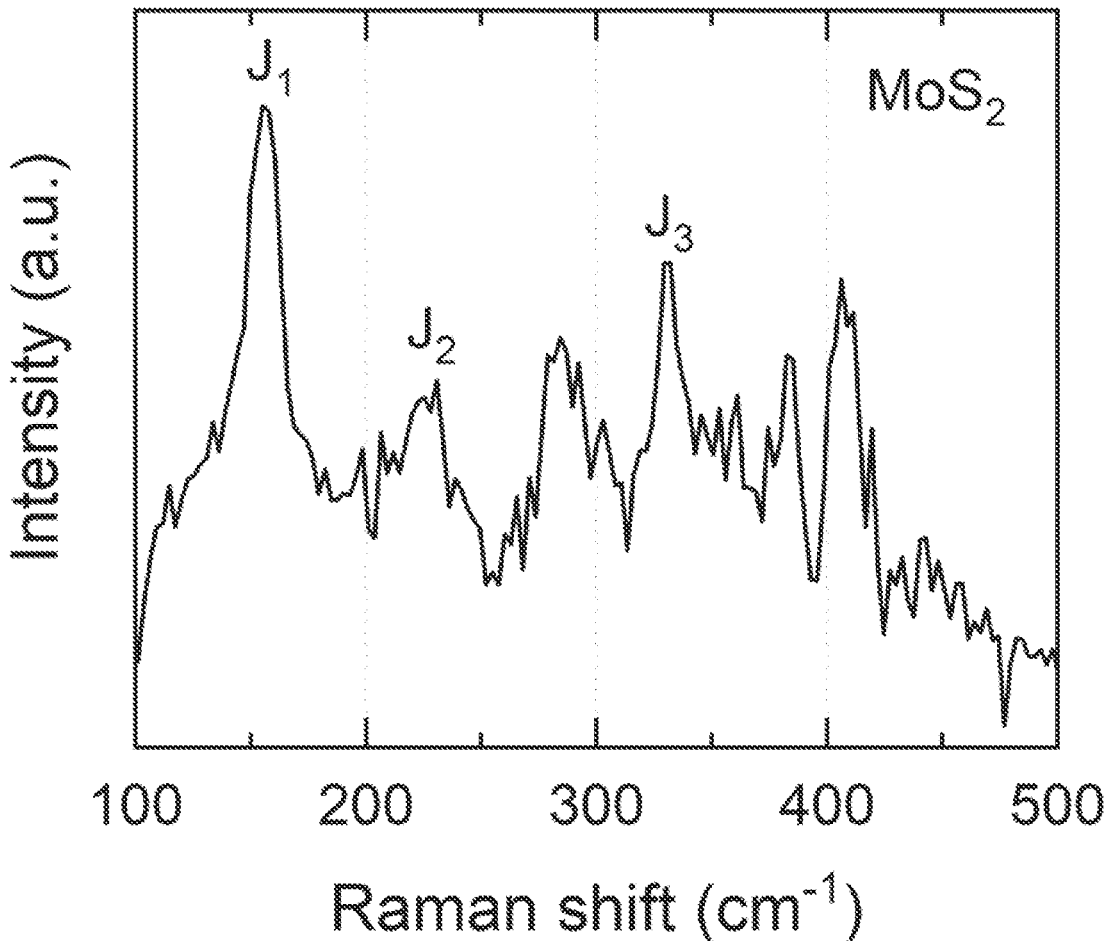
FIG. 5 shows the Raman spectrum of chemically exfoliated $MoS_2$. Signatures from 1T $MoS_2$ are labeled as $J_1$, $J_2$ and $J_3$ peaks at 156 $cm^{-1}$, 226 $cm^{-1}$ and 333 $cm^{-1}$.
Figure 6:
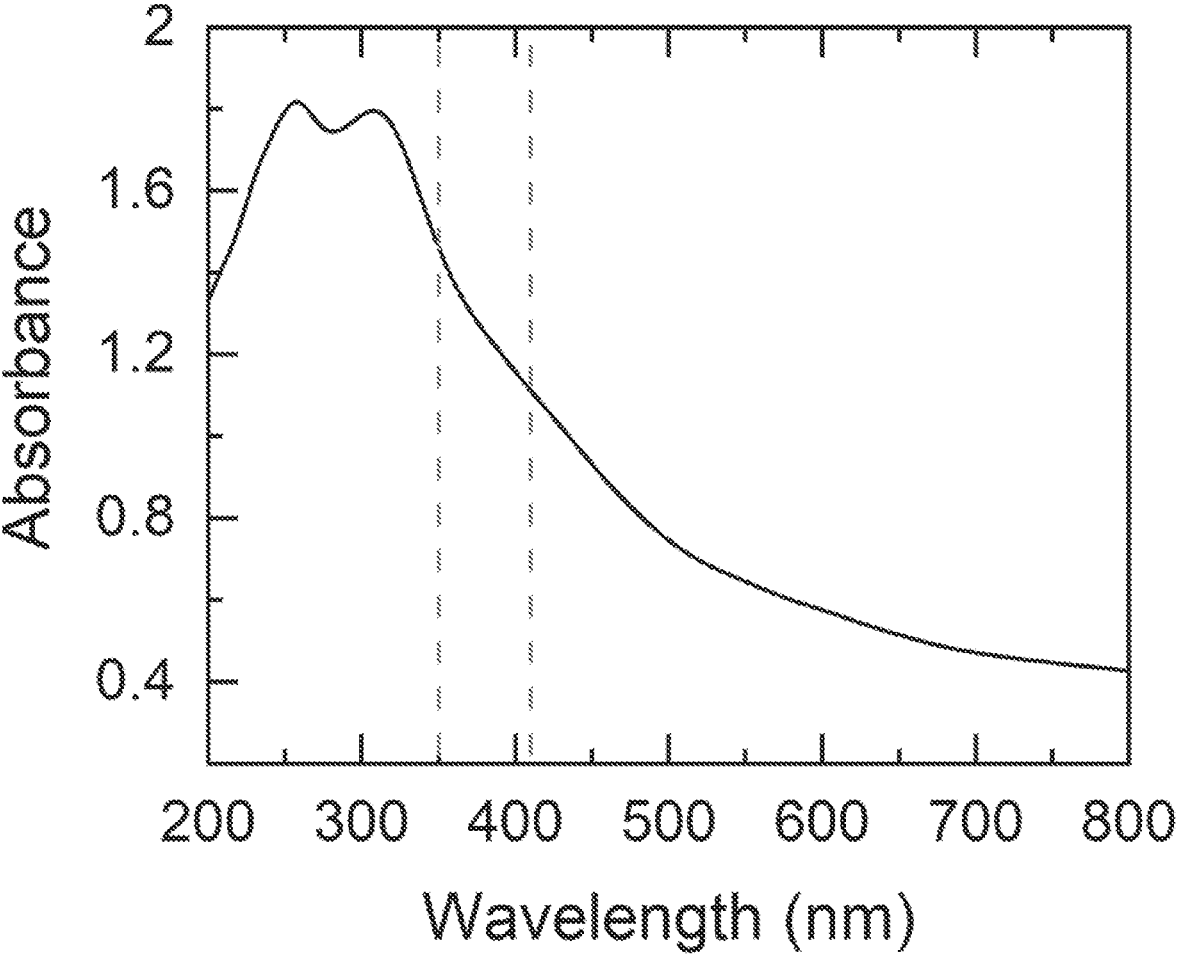
FIG. 6 shows the UV-Vis spectrum of chemically exfoliated $MoS_2$. The 70% of 1T phase was determined by the extinction at 410 over 350 nm as well as the calibration curve in K. C. Knirsch et al., *ACS Nano*, 2015, 9, 6018-6030.
Figure 7:
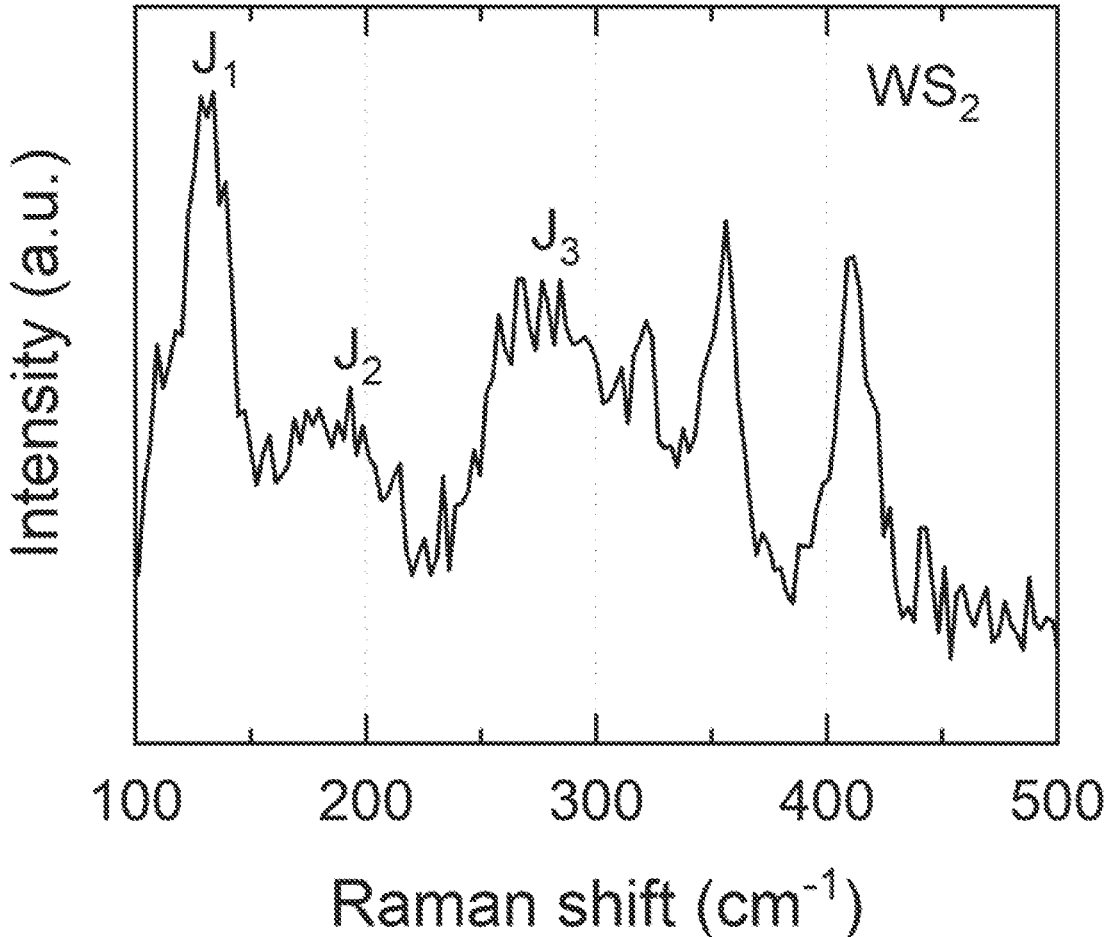
FIG. 7 shows the Raman spectrum of chemically exfoliated $WS_2$. Signatures from 1T $WS_2$ are labeled as $J_1$, $J_2$ and $J_3$.
Figure 8:
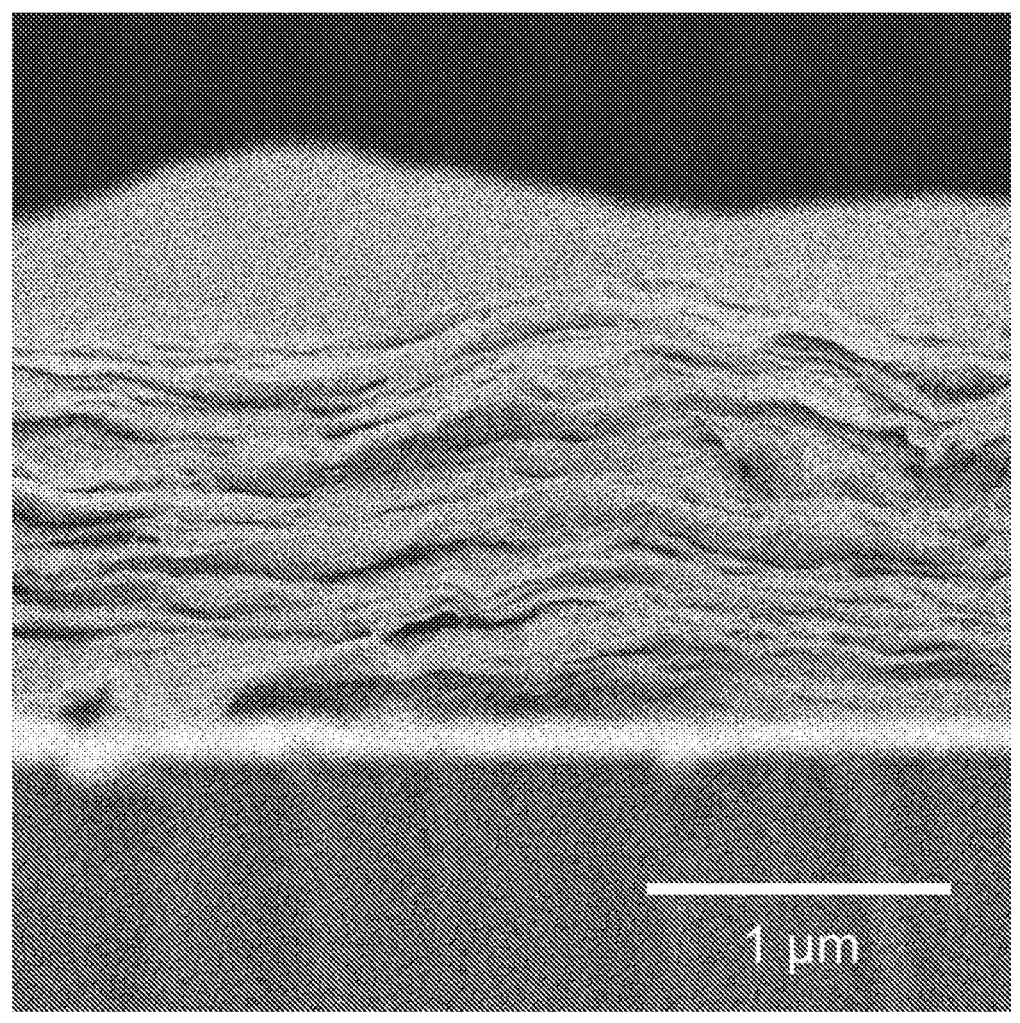
FIG. 8 shows a scanning electron microscopy cross-sectional image of a representative restacked $WS_2$ film.

FIG. 1A shows an optical image of a restacked $MoS_2$ film obtained by vacuum filtration. The thickness of the film can be controlled by the volume of exfoliated $MoS_2$ suspension used in the filtration. From the scanning electron microscopy characterization, the thickness of a representative $MoS_2$ film is about 1 μm (see FIG. 1B). The phase of chemically exfoliated $MoS_2$ is predominantly 1T phase (about 70%) agreeing with the Raman and UV-Vis spectroscopic analysis (FIGS. 5 and 6). FIG. 1C shows that this thin film can be transferred to other surfaces such as conductive substrates (e.g., gold) for further application. The $WS_2$ films prepared via vacuum filtration (FIGS. 7 and 8) demonstrate similar features, including having controllable thickness and being easily transferrable.

Figure 2B:
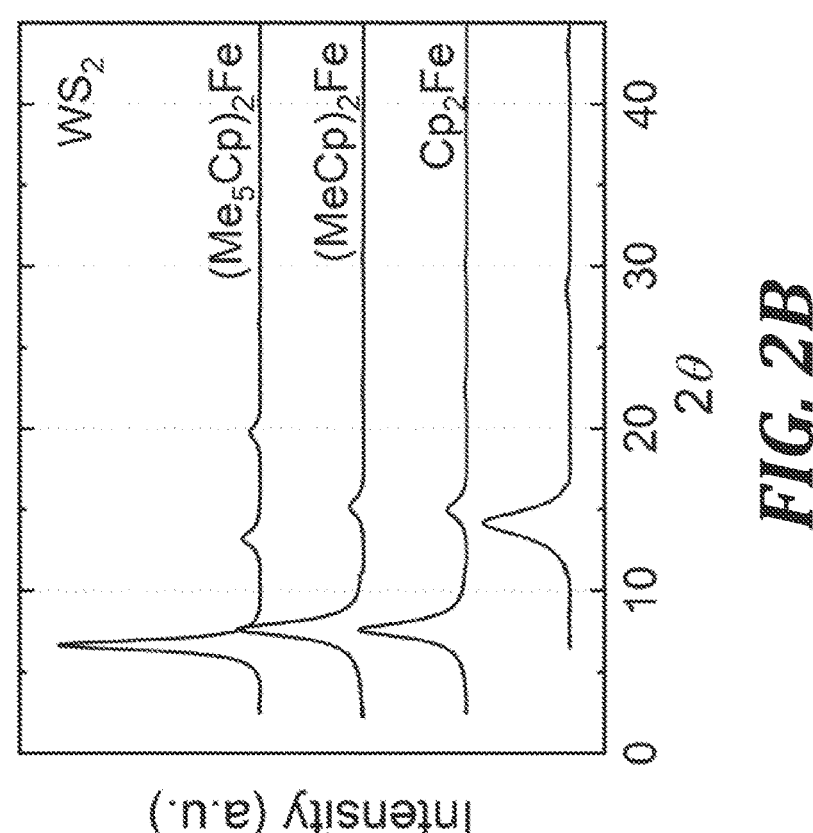
FIGS. 2A and 2B are XRD patterns of metallocene (decamethylferrocene, 1,1'-dimethylferrocene, ferrocene) intercalated $MoS_2$ (2A) and $WS_2$ (2B). Bottom pattern: restacked.
Figure 2A:
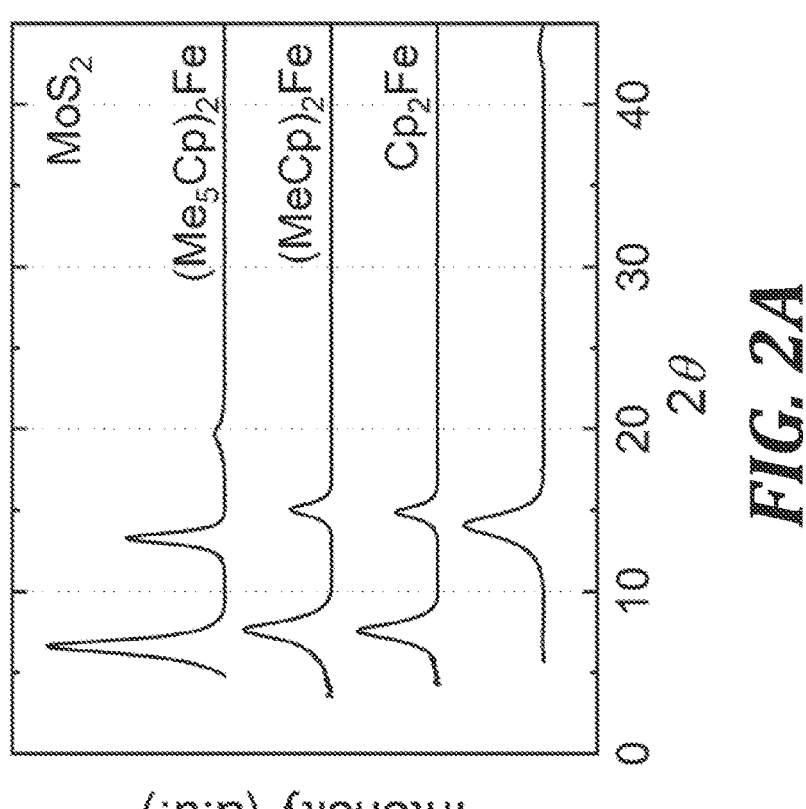

The first class of guest species explored were metallocenes, which have been intercalated into TMDCs previously owing to their interesting spin and electronic properties for superconductivity and catalysis. Ferrocene ($Cp_2Fe$), 1,1'-dimethylferrocene (($MeCp)_2Fe$), and decamethylferrocene (($Me_5Cp)_2Fe$) were intercalated into $MoS_2$ and $WS_2$. X-ray diffraction (XRD) clearly demonstrated the expected lattice expansion arising from intercalation. The XRD results show that the distance between layers in restacked $MoS_2$ and $WS_2$ are about 6.2 Å (FIGS. 2A and 2B, respectively), which agree with the bulk materials. In the XRD of intercalation compounds, the peaks corresponding to the restacked $MoS_2$ and $WS_2$ disappear indicating no residual restacked $MoS_2$ and $WS_2$. The distance between host sheets in the $Cp_2Fe$ intercalated $MoS_2$ and $WS_2$ are both 11.8 Å consistent with the previous literature. The expansion (about 5.6 Å) is close to the van der Waals diameter of a cyclopentadienyl (Cp) ring suggesting the ring is perpendicular to the host layers. Similar expansion (about 5.6 Å) was observed in the (MeCp) $_2Fe$ intercalated $MoS_2$ and $WS_2$. The Cp ring is perpendicular to the host sheets but the methyl group in MeCp is pointing away from the host sheets. In contrast, the distance between the host sheets is about 13.4 Å in ($Me_5Cp)_2Fe$ intercalated $MoS_2$ and $WS_2$. The expansion (about 7.2 Å) is close to the size of $Me_5Cp$, consistent with the ring laying perpendicular to the host sheets. Among the restacked and intercalated films, diffraction peaks were only observed from the {001} plane, indicating a preferred orientation along the z-axis in the thin film samples. The distances between the host sheets in the intercalation compounds are summarized in Table 1.

TABLE 1

Lattice constant of metallocene intercalated $MoS_2$ and $WS_2$.

| Sample | Lattice constant (Å) |
|---|---|
| Restacked $MoS_2$ | 6.2 |
| $Cp_2Fe$—$MoS_2$ | 11.8 |
| ($MeCp)_2Fe$—$MoS_2$ | 11.8 |
| ($Me_5Cp)_2Fe$—$MoS_2$ | 13.3 |
| Restacked $WS_2$ | 6.2 |
| $Cp_2Fe$—$WS_2$ | 11.8 |
| ($MeCp)_2Fe$—$WS_2$ | 11.7 |
| ($Me_5Cp)_2Fe$—$WS_2$ | 13.4 |

The compositions of the metallocene intercalated $MoS_2$ and $WS_2$ were quantitated using inductively coupled plasma optical emission spectroscopy (ICP-OES, Table 2). S/Mo ratios were found to be about 2 consistent with the stoichiometry of the bulk $MoS_2$. The Fe/Mo ratios are 0.118, 0.093, 0.135 in $Cp_2Fe$, ($MeCp)_2Fe$, and ($Me_5Cp)_2Fe$ intercalated $MoS_2$, respectively. The Fe ratio in our compounds is higher than the ferrocene intercalated $MOS_2$ retacked at the interface of two immiscible solutions (Fe/Mo about 0.05). However, our ICP-OES results show that the S/W ratios in the $WS_2$ intercalation compounds are only about 1.8. To understand this discrepancy, the S/W ratio in the bulk $WS_2$ was examined and found to also be about 1.8. The ratio of S/W is lower than the theoretical stoichiometry because of the loss of S during the intense digestion of $WS_2$, which involves HF and $HNO_3$. It was assumed that no formation of volatile Fe and W compounds during the digestion and it was found that Fe/W ratios are 0.058, 0.072, and 0.092 in three different intercalated $WS_2$ samples.

The result shows that the ratio of ($Me_5Cp)_2Fe$ in intercalation compounds is the highest of the metallocene intercalants; however, no clear trend was observed in the ratio of $Cp_2Fe$ and ($MeCp)_2Fe$. It has been suggested that a more reducing guest species tends to form a more stable intercalation compound. Because ($Me_5Cp)_2Fe$ is the most reducing guest species (($Me_5Cp)_2Fe$>($MeCp)_2Fe$>$Cp_2Fe$), the strongest driving force for the ($Me_5Cp)_2Fe$ intercalation and therefore the highest ratio was expected. Besides their reducing power, the size of the molecule also affects the ratio of the guest species in the intercalation compounds by determining the maximum packing density. Due to the orientation of the guest species in the intercalation compounds, the maximum packing density of $Cp_2Fe$ is higher than $(MeCp)_2Fe$. Taken together, the ratio of $Cp_2Fe$ and $(MeCp)_2Fe$ may be a balance influenced by reducing power and the size of intercalant.

TABLE 2

Compositions of the metallocene intercalated $MoS_2$ and $WS_2$ from ICP-OES analysis.

| | Stoichiometry | | |
| Sample | Mo/W | S | Fe |
| --- | --- | --- | --- |
| $Cp_2Fe$—$MoS_2$ | 1 | 1.99 | 0.118 |
| $(MeCp)_2Fe$—$MoS_2$ | 1 | 2.02 | 0.093 |
| $(Me_5Cp)_2Fe$—$MoS_2$ | 1 | 2.00 | 0.135 |
| $Cp_2Fe$—$WS_2$ | 1 | 1.83 | 0.058 |
| $(MeCp)_2Fe$—$WS_2$ | 1 | 1.82 | 0.072 |
| $(Me_5Cp)_2Fe$—$WS_2$ | 1 | 1.79 | 0.092 |

The method described herein is also applicable to intercalation of n-alkylamines into $MoS_2$ and $WS_2$. Alkylamines, which are electron donors, have been successfully intercalated into many layered oxides and TMDCs. Yet ammonium cations have been commonly observed as the end product in intercalation compounds of $MoS_2$ and $WS_2$ arising from cation exchange reactions in the syntheses. One striking property of these intercalation compounds is that the lattice expansion can be tuned by the chain length of alkylamine. Three different chain lengths of alkylamine were evaluated to reveal the chain length dependency in the intercalation compounds: octylamine (OA), dodecylamine (DDA), and hexadecylamine (HDA).

Figure 3B:
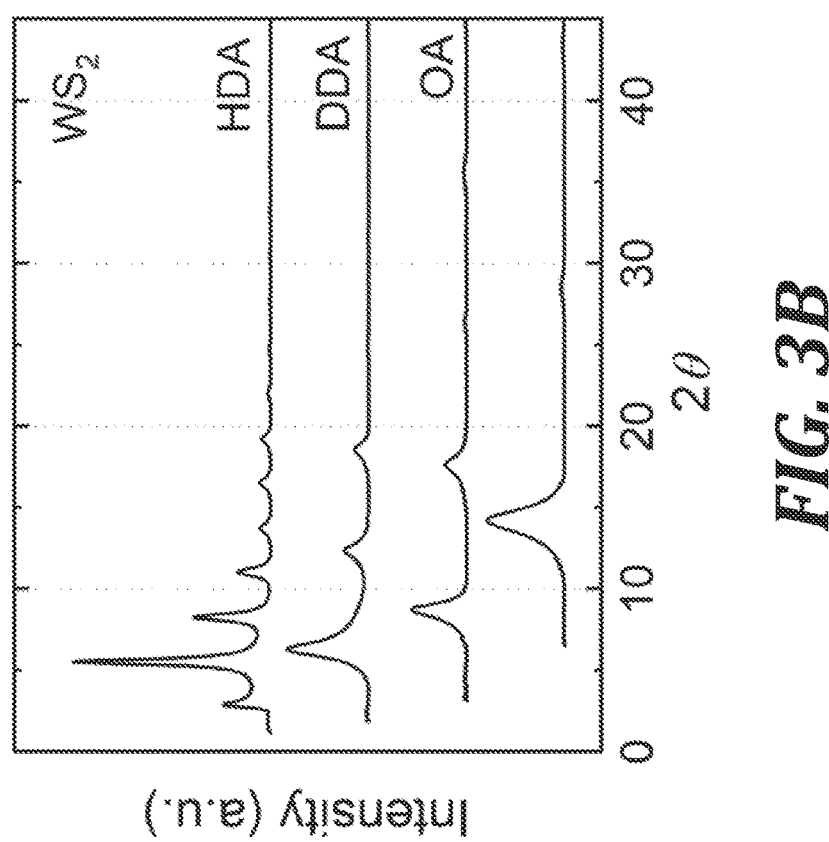
FIGS. 3A and 3B are XRD patterns of n-alkylamine (hexadecylamine, dodecylamine, octylamine) intercalated $MoS_2$ (3A) and $WS_2$ (3B). Bottom pattern: restacked.
Figure 3A:
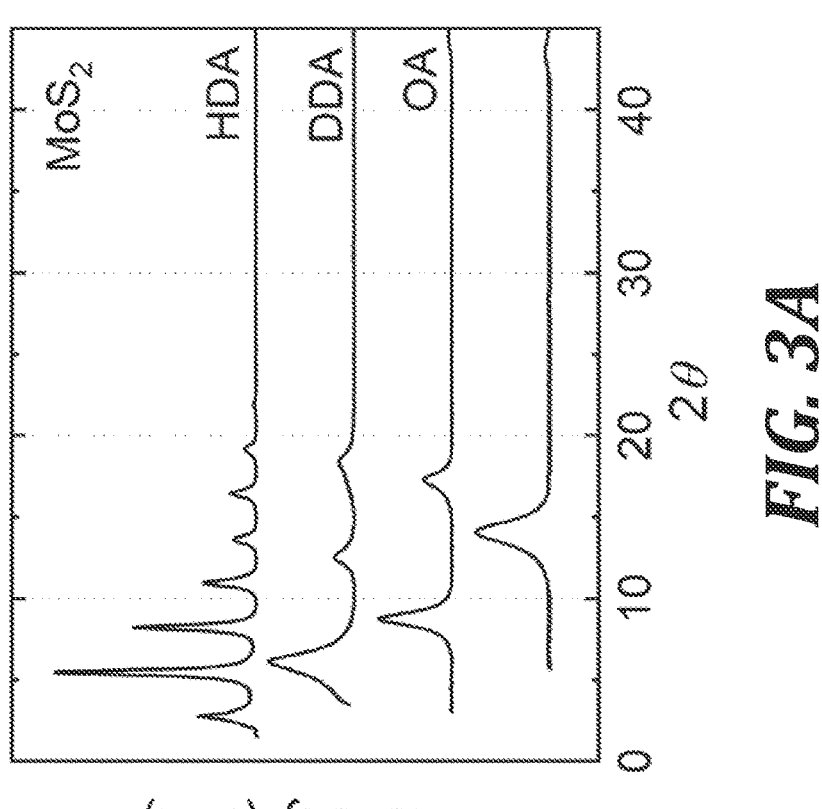

FIGS. 3A and 3B show the XRD data for the alkylamine intercalated $MoS_2$ and $WS_2$. The distance between the TMDC sheets increases with the chain length of alkylamine, where OA-$MoS_2$ is about 10.1 Å, DDA-$MoS_2$ is 14.1 to 14.5 Å, and HDA-$MoS_2$ is about 32.4 Å. A similar trend in $WS_2$ intercalation compounds was observed, where OA-$WS_2$ is about 10.1 Å, DDA-$WS_2$ is about 14.3 Å, and HDA-$MoS_2$ is about 32.4 Å. The results concur with reported n-alkylamine intercalated $MoS_2$ and $WS_2$ synthesized through a direct reaction of lithium intercalated TMDCs with an aqueous solution of alkylamine/ammonia. However, unlike these compounds, which show a diffraction peak at 2θ about 32°, the compounds only showed diffraction peaks from the {001} plane indicating, again, a preferred orientation along the z-axis.

The non-linear increase of the distance between basal planes is attributed to the orientation of the alkylamine. The short chain alkylamine (e.g., OA) prefers lying down in the van der Waals gap of the TMDCs. As shown, the expansion in the OA-$MoS_2$ and OA-$WS_2$ are about 3.9 Å. This value is much shorter than the chain length of OA but close to the van der Waals diameter of the alkyl chain (about 4 Å). This observation suggests the alkyl chain lies parallel to the host sheets. A similar phenomenon has been reported in alkylammonium intercalated $MoS_2$ and alkylamine intercalated $TaS_2$ where the lattice expansion in short chain amine (n<5) intercalation compounds is about 4 Å. Interestingly, the expansion in DDA-$MoS_2$ and DDA-$WS_2$ was found to be about 8.1 Å, which is close to twice of the size of alkyl chain. It is proposed that two layers of DDA are sandwiched between the host sheets. However, it has been suggested that the alkylamine may form a tilted bilayer structure at an angle from 56° to 68°. If a tilted monolayer DDA is assumed in between the host sheets, the tilted angle would be 25.8° much smaller than in the previously reported structures.

In contrast, the distance between host sheets expands to >32 Å in the HDA intercalated compounds. This expansion is close to the length of the alkyl chain implying a monolayer of HDA perpendicular to the host sheets. This structural difference is attributed to the fact that the longer alkyl chain would have stronger van der Waals interaction among the alkyl chains. This interaction may assist the assembly of the amine and stabilize the perpendicular orientation. Considering the guest species need to diffuse into the film, it may be that the materials used could be one of several possible kinetically stable phases. Mixtures of intercalation compounds have been found in the alkylamine intercalation $TaS_2$.

CHN combustion elemental analysis quantified the stoichiometry of OA, DDA, and HDA in both $MoS_2$ and $WS_2$ intercalation compounds (Table 3). It was observed that the stoichiometry of HDA is higher than OA and DDA in both $MoS_2$ and $WS_2$ likely because of the orientation of the alkylamines. Compared with the parallel orientation, the perpendicular orientation occupies less projected area on the sheets leading to a higher packing density. It is noted that mass percentage of carbon from CHN analysis is higher (about 2 to 3%) than the calculated values from the proposed formula in $MoS_2$ intercalation compounds, which is attributed to residual carbon compounds adsorbed on the $MoS_2$. The physical adsorption of solvent has been commonly found on the high-surface-area materials. The composition of restacked $MoS_2$ and $WS_2$ without alkylamine was examined and found that the carbon mass percentage is 2.3% in $MoS_2$ and only about 0.25% in $WS_2$.

TABLE 3

Composition of n-alkylamine intercalated $MoS_2$ and $WS_2$ from CHN combustion elemental analysis. Calculated mass percentages are shown in brackets.

| | Mass percentage | | | Approximate |
| Sample | C | H | N | formula |
| --- | --- | --- | --- | --- |
| OA-$MoS_2$ | 9.918 | 1.719 | 1.074 | $OA_{0.136}MoS_2$ |
| | (7.356) | (1.466) | (1.072) | |
| DDA-$MoS_2$ | 14.414 | 2.086 | 1.093 | $DDA_{0.145}MoS_2$ |
| | (11.178) | (2.111) | (1.086) | |
| HDA-$MoS_2$ | 29.020 | 4.781 | 1.869 | $HDA_{0.319}MoS_2$ |
| | (25.855) | (4.746) | (1.884) | |
| OA-$WS_2$ | 7.463 | 1.404 | 0.989 | $OA_{0.203}WS_2$ |
| | (7.113) | (1.418) | (1.037) | |
| DDA-$WS_2$ | 9.705 | 1.651 | 0.975 | $DDA_{0.194}WS_2$ |
| | (9.848) | (1.859) | (0.957) | |
| HDA-$WS_2$ | 17.155 | 2.849 | 1.254 | $HDA_{0.283}WS_2$ |
| | (17.194) | (3.156) | (1.253) | |

Figure 4B:
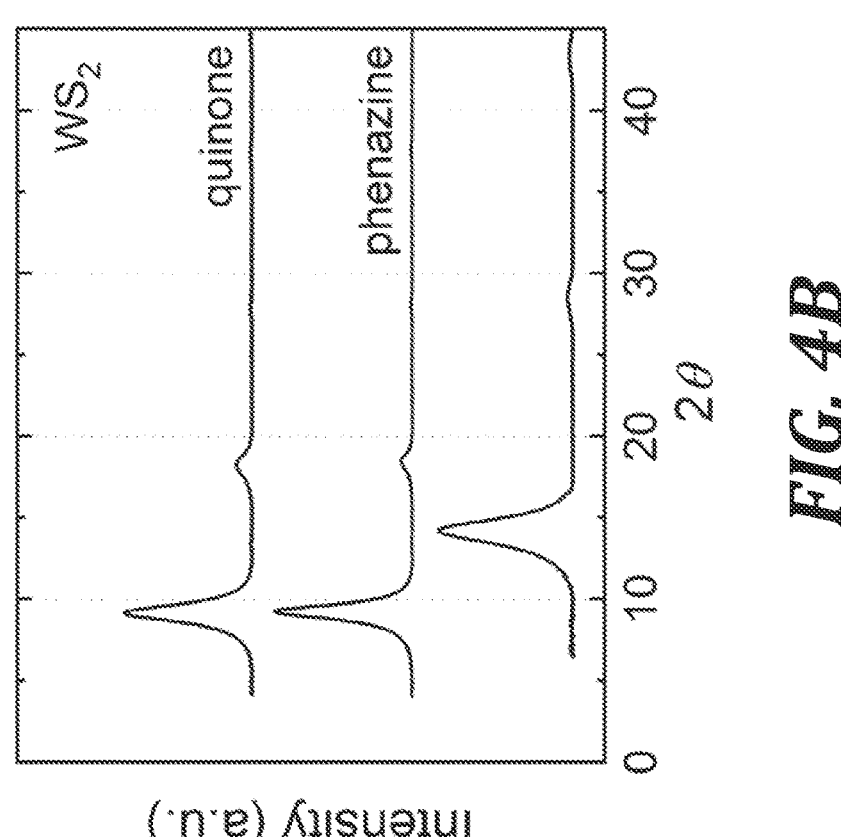
FIGS. 4A and 4B are XRD patterns of electro-proton transfer mediator (p-benzoquinone, phenazine) intercalated $MoS_2$ (4A) and $WS_2$ (4B). Bottom pattern: restacked.
Figure 4A:
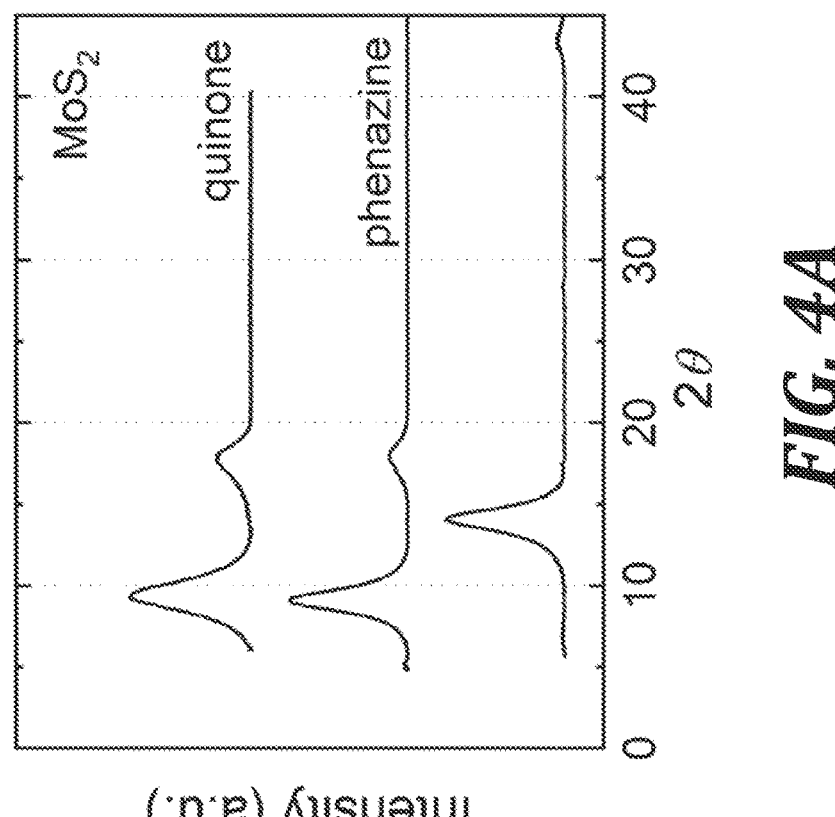

The method described herein also enables synthesis of intercalation compounds beyond those that have been synthesized previously. Electron-proton transfer mediators (e.g., phenazine and p-benzoquinone) are intercalated into $MoS_2$ and $WS_2$. FIGS. 4A and 4B show the XRD patterns of p-benzoquinone and phenazine intercalated $MoS_2$ and $WS_2$, respectively. The expansion from the intercalation is about 3.4 Å, which is close to the van der Waals diameter of the carbon atom (3.4 Å). This observation suggests that the carbon ring of the molecules lie parallel to host sheets. The size of p-benzoquinone (8.3×6.6 Å$^2$) and phenazine (11.3× 7.2 Å$^2$) was used to estimate their monolayer maximum packing density. In intercalation compounds of $MoS_2$, the maximum ratio of p-benzoquinone is about 0.213 whereas the maximum ratio of phenazine is about 0.121. Both show slightly higher packing density in the intercalation compounds of $WS_2$ (about 0.223 for p-benzoquinone and about 0.127 for phenazine) due to the larger lattice constant of $WS_2$.

Figure 9B:
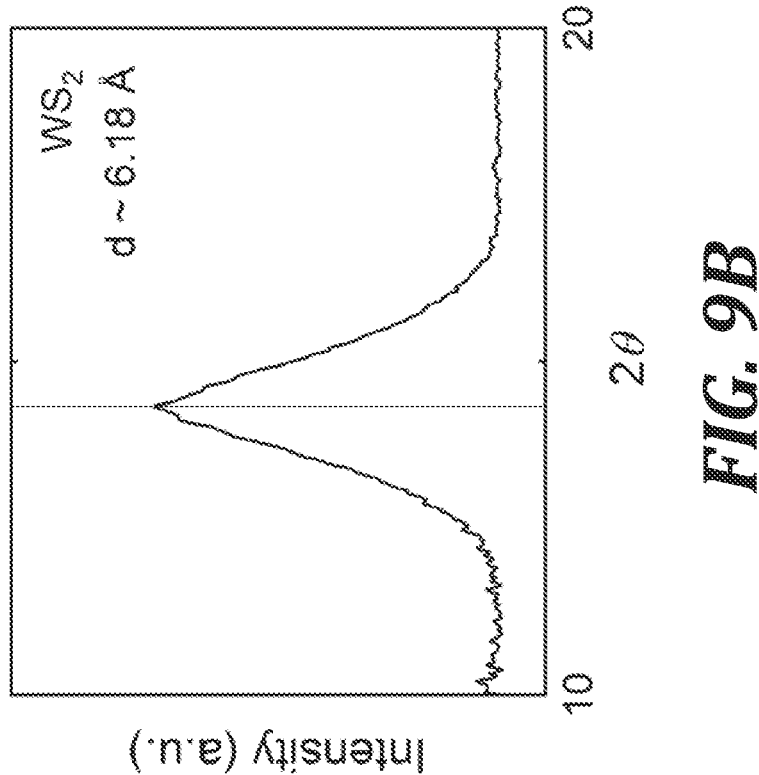
FIGS. 9A and 9B are XRD patterns of the toluene treated $MoS_2$ and $WS_2$, respectively.
Figure 9A:
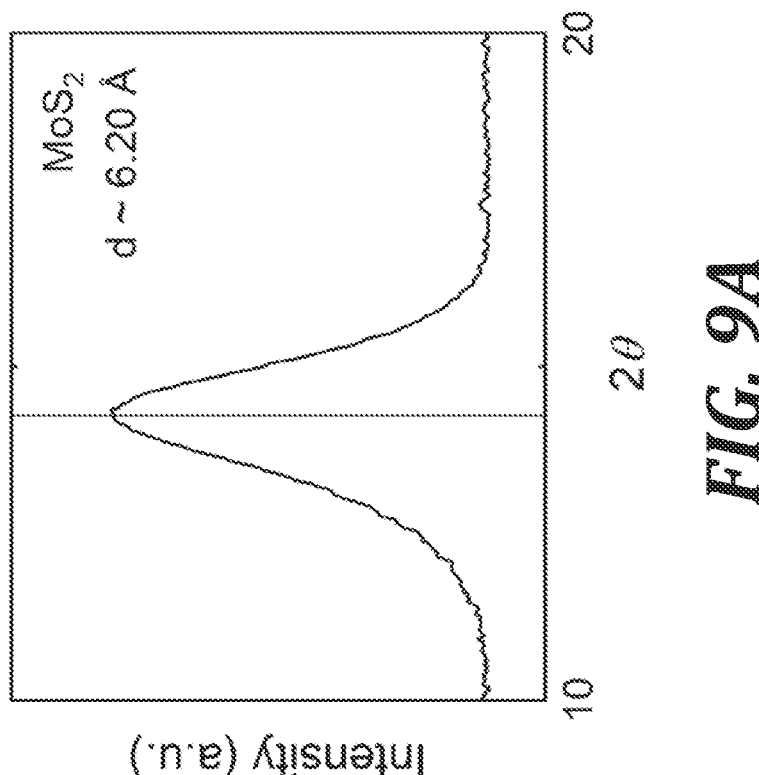

The percentage of phenazine in the intercalation compounds was quantified using CHN combustion elemental analysis (Table 4). It was found that the ratio of phenazine in the intercalation compounds is around 7 to 8%. Interestingly, the mass percentage of carbon is a few percent higher than the calculated value from the proposed formula, similar to what was observed in the alkylamine intercalated $MoS_2$. Toluene molecules may adsorb and/or intercalate into the $MoS_2$ and $WS_2$. To confirm whether toluene can intercalate into $MoS_2$ and $WS_2$, phenazine was removed and only added toluene in the process of vacuum filtration. The XRD of toluene treated $MoS_2$ and $WS_2$ (FIGS. 9A and 9B) shows no shift in the diffraction peak position indicating no intercalation of toluene. While co-intercalation of toluene and phenazine could occur, it was expected that the lattice expansion from the co-intercalation should be larger. After including toluene (presumed to be adsorbed to the material surface) in the proposed formula, the ratio of phenazine remains about 7 to 8% (Table 6).

TABLE 6

Compositions of the phenazine intercalated $MoS_2$ and $WS_2$ from CHN elemental analysis. Calculated mass percentages are shown in the brackets.

| Sample | Mass percentage | | | Approximate formula |
| | C | H | N | |
|---|---|---|---|---|
| Phenazine-$MoS_2$ | 9.154 | 0.76 | 1.326 | $(C_{12}H_8N_2)_{0.085}(C_7H_8)_{0.051}MoS_2$ |
| | (9.183) | (0.609) | (1.322) | |
| Phenazine -$WS_2$ | 5.467 | 0.654 | 0.745 | $(C_{12}H_8N_2)_{0.071}(C_7H_8)_{0.051}WS_2$ |
| | (5.470) | (0.371) | (0.749) | |

Due to the residual hydrocarbons, the ratio of p-benzoquinone in the intercalation compounds cannot be quantified. The ratio is estimated by assuming a constant ratio of residual toluene (i.e., 0.05) in all intercalation compounds. The estimation shows the ratio of the p-benzoquinone is roughly 10% (Table 5). While the structure of the intercalation compounds requires further characterization, the XRD and elemental analysis results confirm the intercalation of phenazine and p-benzoquinone in the $MOS_2$ and $WS_2$.

TABLE 5

Compositions of the p-benzoquinone intercalated $MoS_2$ and $WS_2$ from CHN elemental analysis. Calculated mass percentages are shown in the brackets.

| Sample | Mass percentage | | | Approximate formula |
| | C | H | N | |
|---|---|---|---|---|
| Quinone-$MoS_2$ | 6.151 | 0.614 | 0.091 | $(C_6H_4O_2)_{0.090}(C_7H_8)_{0.051}MoS_2$ |
| | (6.174) | (0.444) | (0) | |
| Quinone -$WS_2$ | 4.56 | 0.38 | 0.04 | $(C_6H_4O_2)_{0.108}(C_7H_8)_{0.051}WS_2$ |
| | (4.567) | (0.320) | (0) | |

TABLE 4

Compositions of the phenazine intercalated $MoS_2$ and $WS_2$ from CHN elemental analysis. Calculated mass percentages are shown in the brackets.

| Sample | Mass percentage | | | Approximate formula |
| | C | H | N | |
|---|---|---|---|---|
| Phenazine-$MoS_2$ | 9.154 | 0.76 | 1.326 | $(C_{12}H_8N_2)_{0.083}MoS_2$ |
| | (6.834) | (0.382) | (1.328) | |
| Phenazine - $WS_2$ | 5.467 | 0.654 | 0.745 | $(C_{12}H_3N_2)_{0.069}WS_2$ |
| | (3.819) | (0.214) | (0.742) | |

The present disclosure provides a versatile approach for directly intercalating guest species into two-dimensional restacked thin films (e.g., $MoS_2$ and $WS_2$). A feature of the product intercalated materials is the transferrable thin-film morphology. In the method, ferrocene and n-alkylamine intercalated $MoS_2$ and $WS_2$ films were synthesized by vacuum filtration. As disclosed herein, electron-proton transfer mediators (i.e., phenazine and benzoquinone) were intercalated into $MoS_2$ and $WS_2$ films for the first time.

As used herein, the term "about" refers to ±5% of the specified value.

Representative Method for Making Intercalated Thin Films

The following is a description of making representative $MoS_2$ and $WS_2$ thin films intercalated with various guest species.

Materials. Molybdenum (IV) sulfide powder (<2 μm, 99%), tungsten (IV) sulfide powder (2 μm, 99%), n-butyllithium solution (1.6 M in hexane), ferrocene (98%), 1,1'-dimethylferrocene (95%), bis(pentamethylcyclopentadienyl)iron (II) (97%), and phenazine (98%) were purchased from Sigma-Aldrich and used as received without further purification. p-Benzoquinone (99.5%) was purchased from Sigma-Aldrich and purified via sublimation. Octylamine (99%), dodecylamine (98%), and hexadecylamine (98%) were purchased from Sigma-Aldrich and heated at 100° C. for 10 min under nitrogen prior to use. Pentane was purchased anhydrous and stored over 3 Å molecular sieves prior to use. Hexane (98.5%, Sigma Aldrich), toluene (99.8%, Fisher Chemical), methanol (99.9%, Fisher Chemical) were used as received without further purification.

Exfoliation of $MoS_2$ and $WS_2$. The exfoliation was performed by using the lithium intercalation method as described in M. Acerce, D. Voiry and M. Chhowalla, *Nat. Nanotechnol.*, 2015, 10, 313-318. Briefly, 320 mg of $MoS_2$ was charged into an oven-dried 50 mL Schlenk flask. After degassing and cycling with nitrogen three times, 5 mL 1.6 M n-butyllithium solution in hexane was added. The flask was at room temperature and stirring at 300 rpm for 48 hr under nitrogen. After 48 hr, the flask was transferred into a nitrogen glovebox. Pentane was added to wash the materials at least 3 times. The $Li_xMoS_2$ was stored under nitrogen. 497 mg of $WS_2$ was added into an oven-dried three-neck round bottom flask. 5 mL 1.6 M n-butyllithium solution in hexane was added. The solution was refluxed at 70° C. with magnetic stirring at 300 rpm for 48 hr under nitrogen. After 48 hr, the flask was transferred into a nitrogen glovebox. Pentane was added to wash the materials at least 3 times. The $Li_xWS_2$ was stored under nitrogen.

About 67.5 mg of $Li_xMoS_2$ (about 100 mg of $Li_xWS_2$) was transferred into a centrifuge tube in a nitrogen glovebox. Deionized water (>18 MΩ cm) that had been degassed for at least 15 min was added into the tube immediately after the tube was transferred out of the glovebox. The tube was sonicated for 1 hr and the temperature was kept below 30° C. The mixture was centrifuged at 2500 rpm to remove the non-exfoliated TMDCs sheets and 11000 rpm for 15 minutes three times to remove the lithium salt byproducts. The exfoliated $MoS_2$ and $WS_2$ suspensions were used immediately after preparation.

Synthesis of metallocene intercalated $MoS_2$ and $WS_2$. 15 mL of exfoliated $MoS_2/WS_2$ suspension was restacked on a nitrocellulose membrane (0.025 μm, MF-Millipore™) by vacuum filtration. After the suspension was filtered, 3 mL of a saturated hexane solution containing the metallocene was added into the filtration funnel while the membrane was still wet. The vacuum filtration proceeded for 1 hour. The material was washed with hexane 4 to 5 times to remove residual metallocene.

Synthesis of n-alkylamine intercalated $MoS_2$ and $WS_2$. 15 mL of exfoliated $MoS_2/WS_2$ suspension was restacked on a nylon membrane (0.2 μm, MF-Millipore™) by vacuum filtration. After the suspension was filtered, 0.2 mmol of n-alkylamine in 6 mL of methanol was added into the filtration funnel while the membrane was still wet. The filtration was carried out under static vacuum. Before the solution in the flask completely dried out, the material was washed with methanol 4 to 5 times to remove residual alkylamine.

Synthesis of phenazine and p-benzoquinone intercalated $MoS_2$ and $WS_2$. 15 mL of exfoliated $MoS_2/WS_2$ suspension was restacked on a nitrocellulose membrane (0.025 μm, MF-Millipore™) by vacuum filtration. After the suspension was filtered, 3 mL of saturated phenazine toluene solution (1.5 mmol of p-benzoquinone in 3 mL of toluene) was added into the filtration funnel while the membrane was still wet. The vacuum filtration proceeded for 1 hour. The material was washed with toluene 4 to 5 times to remove residual guest species.

Characterization. X-ray diffraction data were obtained from a Bruker D8 Discover instrument with the IμS 2-D XRD system. Raman spectra were recorded on a Renishaw Raman Confocal and 514 nm laser was used. Scanning electron microscopy images were obtained from an Apreo variable-pressure SEM. A PerkinElmer Optima 8300 inductively coupled plasma-optical emission spectrophotometer was used for elemental analysis. Solutions of $MoS_2$ samples were prepared by dissolving the materials in aqua regia whereas $WS_2$ intercalated samples were digested using a mixture of HF, $HNO_3$, and $H_2O$ (volume ratio 1:1:1). Microanalysis was conducted by the CENTC Elemental Analysis Facility at the University of Rochester. Microanalysis samples were weighed with a PerkinElmer Model AD6000 Autobalance and their compositions were determined with a PerkinElmer 2400 Series II Analyzer.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of making an intercalated layered film, comprising:

filtering a suspension of a dispersed two-dimensional compound in a fluid through a filtration medium to provide a layered film of the two-dimensional compound on the filtration medium; and filtering a solution of an intercalant in a solvent through the layered film of the two-dimensional compound on the filtration medium to provide the intercalated layered film.

2. The method of claim 1, wherein the dispersed two-dimensional compound comprises a transition metal dichalcogenide, graphene or related group XIV 2D materials, boron nitride, a MXene, graphene oxide, phosphorene or related group XV 2D materials, MBenes, or any combination thereof.

3. The method of claim 1, wherein the dispersed two-dimensional compound comprises a transition metal dichalcogenide.

4. The method of claim 3, wherein the transition metal dichalcogenide comprises a formula $ME_2$, wherein:

M comprises an element of group IV, V, or VI, and

E comprises S, Se, Te, and any combination thereof.

5. The method of claim 2, wherein the suspension of the dispersed two-dimensional compound comprises a two-dimensional compound prepared by exfoliation.

6. The method of claim 1, wherein layered film of the two-dimensional compound on the filtration medium comprises a monolayer or a multilayer of the two-dimensional compound.

7. The method of claim 1, wherein the filtration medium is a filtration membrane.

8. The method of claim 7, wherein the filtration membrane is selected from the group consisting of a nitrocellulose membrane, a cellulose acetate membrane, a cellulose nitrate membrane, a polyamide (nylon) membrane, a polycarbonate membrane, a polypropylene membrane, a polyether sulfone membrane, a polyvinyl chloride membrane, a polyvinylidene fluoride membrane, and a polytetrafluoroethylene membrane.

9. The method of claim 1, wherein the intercalant comprises an organometallic compound, a cationic compound, a nucleophilic organic compound, a non-nucleophilic organic compound, a molecular cluster compound, a nanoparticle, or any combination thereof.

10. The method of claim 1, wherein the intercalant is an electron-proton transfer mediator.

11. The method of claim 10, wherein the electron-proton transfer mediator is a ferrocene, a phenazine, or a benzoquinone.

12. A method of making an intercalated layered film, comprising:

filtering a suspension of a dispersed two-dimensional compound in a fluid through a filtration medium to provide a layered film of the two-dimensional compound on the filtration medium; and filtering a solution of an electron-proton transfer mediator in a solvent through the layered film of the two-dimensional compound on the filtration medium to provide an intercalated layered film having an electron-proton transfer mediator as an intercalant.

13. The method of claim 12, wherein the electron-proton transfer mediator is a ferrocene, a phenazine, or a benzoquinone.

* * * * *